(12) United States Patent
Skjevik

(10) Patent No.: US 12,000,520 B2
(45) Date of Patent: Jun. 4, 2024

(54) PROTECTOR FOR THE ENDS OF AN ELONGATE MEMBER

(71) Applicant: BEWI ENERGY AS, Hamarvik (NO)

(72) Inventor: Geir Skjevik, Trondheim (NO)

(73) Assignee: Bewi Energy AS (NO)

( * ) Notice: Subject to any disclaimer, the term of this patent is extended or adjusted under 35 U.S.C. 154(b) by 520 days.

(21) Appl. No.: 17/291,426

(22) PCT Filed: Nov. 6, 2019

(86) PCT No.: PCT/GB2019/000156
§ 371 (c)(1),
(2) Date: May 5, 2021

(87) PCT Pub. No.: WO2020/095016
PCT Pub. Date: May 14, 2020

(65) Prior Publication Data
US 2022/0003049 A1 Jan. 6, 2022

(30) Foreign Application Priority Data

| Nov. 6, 2018 | (GB) | 1818116 |
| Jun. 27, 2019 | (GB) | 1909268 |
| Oct. 9, 2019 | (GB) | 1914630 |

(51) Int. Cl.
*F16L 57/00* (2006.01)
*B25J 15/00* (2006.01)
(Continued)

(52) U.S. Cl.
CPC ......... *F16L 57/005* (2013.01); *B25J 15/0033* (2013.01); *B65D 59/06* (2013.01);
(Continued)

(58) Field of Classification Search
CPC ....... F16L 57/005; B65D 59/02; B65D 59/06; E21B 12/04
(Continued)

(56) References Cited

U.S. PATENT DOCUMENTS

| 2,145,705 A | 1/1939 | Wodtke |
| 2,745,438 A | 5/1956 | Floyd |

(Continued)

FOREIGN PATENT DOCUMENTS

| CH | 269761 A | 7/1950 |
| CN | 203961827 U | 11/2014 |

(Continued)

OTHER PUBLICATIONS

International Search Report and Written Opinion for Application No. PCT/GB2019/000156 dated May 14, 2020 (17 pages).

(Continued)

*Primary Examiner* — Patrick F Brinson
(74) *Attorney, Agent, or Firm* — Michael Best & Friedrich LLP

(57) ABSTRACT

A protective cap (1) is proposed for an end of an elongate member (6), such as a male connecting end of a pipe or tube. The cap (1) comprises a sheath of flexible, resilient (i.e. elastic) material (2) to cover part of the outer surface of the member (6) at an end of the member. The protective cap (1) can be applied to the end of the member by unfurling at least part of the sheath 3 from a gathered configuration, such as a rolled-up configuration. The protective cap (1) includes resilient ridges (8) extending inwardly from an insert member (2), and/or a chip at least partly within the cap.

20 Claims, 16 Drawing Sheets

(51) Int. Cl.
  *B65D 59/06* (2006.01)
  *E21B 17/00* (2006.01)
  *E21B 17/042* (2006.01)
  *E21B 17/10* (2006.01)
  *E21B 17/12* (2006.01)
  *F16L 55/115* (2006.01)
  *E21B 19/16* (2006.01)

(52) U.S. Cl.
  CPC .......... *E21B 17/006* (2013.01); *E21B 17/042* (2013.01); *E21B 17/1085* (2013.01); *E21B 17/12* (2013.01); *F16L 55/115* (2013.01); *E21B 19/161* (2013.01)

(58) Field of Classification Search
  USPC .............................................. 138/96 T, 96 R
  See application file for complete search history.

(56) References Cited

U.S. PATENT DOCUMENTS

| | | | |
|---|---|---|---|
| 4,157,100 A * | 6/1979 | Turk | F16L 57/005 |
| | | | 138/96 T |
| 4,425,945 A | 1/1984 | McDonald | |
| 4,429,719 A | 2/1984 | Mosing | |
| 4,553,567 A | 11/1985 | Telander | |
| 4,655,256 A | 4/1987 | Lasota et al. | |
| 4,733,888 A * | 3/1988 | Toelke | F16L 57/005 |
| | | | 138/96 T |
| 4,757,595 A * | 7/1988 | Fraering, Jr. | B65D 59/00 |
| | | | 29/458 |
| 2005/0230109 A1 | 10/2005 | Kammann et al. | |
| 2007/0113910 A1* | 5/2007 | Pagura | F16L 57/005 |
| | | | 138/96 T |
| 2008/0136164 A1 | 6/2008 | Knappmiller | |
| 2008/0314468 A1* | 12/2008 | Houghton | F16L 55/1152 |
| | | | 138/104 |
| 2013/0000771 A1 | 1/2013 | Beaton et al. | |
| 2013/0213517 A1* | 8/2013 | Drouin | F16L 57/00 |
| | | | 138/96 T |
| 2014/0130928 A1 | 5/2014 | Drouin et al. | |
| 2015/0300552 A1 | 10/2015 | Chang | |
| 2015/0308605 A1 | 10/2015 | Aguilar et al. | |
| 2018/0023749 A1 | 1/2018 | Ludwig | |

FOREIGN PATENT DOCUMENTS

| | | |
|---|---|---|
| DE | 2939383 A1 | 4/1981 |
| DE | 29809635 U1 | 8/1998 |
| EP | 0398210 A2 | 11/1990 |
| GB | 1436274 A | 5/1976 |
| GB | 1597711 A | 9/1981 |
| GB | 2585386 A | 1/2021 |
| JP | S6070544 U | 5/1985 |
| JP | 2008250714 A | 10/2008 |
| NL | 2001685 C2 | 12/2009 |
| RU | 2043272 C1 | 9/1995 |

OTHER PUBLICATIONS

United Kingdom Intellectual Property Office Search Report for Application No. GB1818116.4 dated Apr. 11, 2019 (5 pages).
United Kingdom Intellectual Property Office Search Report for Application No. GB1914630.7 dated Nov. 6, 2019 (5 pages).
European Patent Office Action for Application No. 19839105.4 dated Sep. 28, 2022 (4 pages).
International Preliminary Report on Patentability for Application No. PCT/GB2019/000156 dated May 11, 2021 (10 pages).
United Kingdom Intellectual Property Office Further Search Report for Application No. GB1914630.7 dated Nov. 6, 2019 (3 pages).
United Kingdom Intellectual Property Office Further Search Report for Application No. GB1818116.4 dated Jun. 24, 2019 (3 pages).

* cited by examiner

PROTECTOR FOR THE ENDS OF AN ELONGATE MEMBER

RELATED APPLICATION DATA

This application is a U.S. National phase application of International Application No. PCT/GB2019/000156 filed Nov. 6, 2019, which claims priority to Application Nos. GB 1818116.4 filed Nov. 6, 2018; GB 1909268.3 Jun. 27, 2018; and GB 1914630.7 Oct. 9, 2019, the entire contents of all of which are herein incorporated by reference herein.

FIELD OF INVENTION

The present invention relates to protectors for the ends of elongate members, and particularly to caps for the pin ends (or box ends) of pipes, such as pipes used in drilling operations and well activity, or in the mining industry. In particular, the protectors are adaptable for use with elongate members having any size within a predetermined range which encompasses multiple nominal diameters.

BACKGROUND OF THE INVENTION

It is important for pipes used in drilling operations to be highly reliable; faults within a string of pipes can cause serious problems, both for the mechanical operation of the machinery (with related financial costs) and for the environment. Accordingly, it is essential to protect pipes during storage and transportation of the pipes. Wear generated in storage or transit is particularly undesirable as it decreases the lifetime of the pipe.

The end portions of an oil pipe are often termed the "box end" and "pin end", and are female and male connecting end portions respectively. The box and pin ends of pipes often comprise helical threads to interlink and secure neighboring pipes to one another. The thread of the box end is provided on an inwardly-facing surface, and the thread of the pin end is provided on an outwardly-facing surface. Avoiding wear to the threads of the pipes is of particular importance, as the connections between the pipes are the most vulnerable portion of a string of pipes.

Protectors for pipes are well known, and are usually caps formed of metal or strong plastic that are designed to be screwed onto/into the threaded sections of the pin/box end of the pipe. A problem with this is that different pipes have the different dimensions, and not all threads are identical. Accordingly, someone intending to protect a pipe would have to acquire a specific protector for a specific pipe diameter and thread configuration. This creates additional logistic and financial burdens on the user of pipes for drilling operations. The financial burden is further compounded by the fact that the specific threads are usually licensed, and therefore the cost of a specific protector may be high.

A further problem with threaded protectors is that it takes significant time to apply the protector to the pipe, and subsequently to remove it. Furthermore, as the pipes are often large in diameter, a large force is required to rotate the protector and thread it onto or off the pipe. Accordingly, injuries to a user's shoulders and arms are common.

SUMMARY OF THE INVENTION

It is an object of the present invention to provide new and useful protectors for an end of elongate objects, for example for the pin ends (or in some cases box ends) of pipes.

In general terms, a first aspect of the invention proposes a protective cap for the end of an elongate member, such as a male connecting end of a pipe or tube. The protective cap comprises a base portion. The base portion comprises an end section (e.g. a substantially flat wall) and a tubular wall (e.g. upstanding around a periphery of the end section) and thereby defines a cavity. An insert portion of the protective cap is also provided, and is partly or fully contained within the cavity of the base portion. For example, the cap may define an axis (which may be transverse to the end section of the base portion) and at least part of the inset portion may be at a position along axis which surrounded by a corresponding part of the base portion at the same axial position). The base portion is rigid (e.g. self-supporting, and, for a given unit volume, more resistant to deformation than the insert portion). The insert portion is formed of a flexible, resilient (i.e. elastic) material.

If the elongate member is a pipe with a threaded outer surface, the protective cap can protect the pipe without being required to have a specific thread pattern that matches the thread pattern of the pipe. The protective cap can be attached to the pipe without applying a rotational motion to the protective cap, so there is reduced risk of damage to the user's shoulders and arms. Furthermore, the operation can typically be performed more quickly than applying or removing a conventional protector.

The insert portion includes one or more inwardly projecting ridges, e.g. in axial register with the tubular walls of the base portion.

At least one of the ridges may resiliently hold the elongate member at a certain spacing from the rest of the insert portion and base portion, to reduce the chance of mechanical damage to the elongate member if the base portion experiences a shock.

Additionally, at least one of the ridges may engage with a formation (e.g. a thread) on the outer surface of the elongate member.

Additionally, at least one of the ridges may optionally act as a seal, to prevent axial fluid flow along the outer surface of the elongate member.

When the end of an elongate member is inserted into the insert portion of the cap, such that the inner surface of the insert portion is in contact with the outer surface of the elongate member, the ridge(s) may secure the cap to the outer surface of the elongate member. For example, the ridge(s) may be reliantly urged against the outer surface of the elongate member, or be secured to the outer surface of the elongate member by frictional forces.

The ridge(s) may be circularly symmetric about a central axis of the cap. There may be two or more ridges extending circumferentially about a central axis of the cap, the ridges being operative to secure the cap to the outer surface of the elongate member. In the case that the ridges act as a seal, providing multiple ridges improves the sealing efficiency of the cap.

The ridges may take any shape (e.g. their cross-section transverse to a length direction of the ridges may be triangular or semi-circular). The ridges may be adjacent to each other on the inner surface of the insert portion, or they may be spaced-apart.

As mentioned above, one can define a central axis which passes through the end section of the base portion, and threads through the insert portion and the cover portion. The ridges may encircle this central axis. The inner surface of the insert portion may be circularly symmetric around the central axis; further, the ridges on the circularly symmetric inner surface may themselves be circular. In other embodiments, the ridges may extend in a direction having a component parallel to the axis; for example they may be helical or may extend parallel to the axis of the cap.

The ridges may additionally be provided with a lubricant for dispersing on the outer surface of the elongate member; in particular, when the elongate member is a threaded pipe, the ridges on the inner surface of the insert portion are designed to coat the outwardly-facing threads of the pin end of the pipe in lubricant.

The insert portion may not cover the whole inner surface of the base portion. For example, the insert portion may comprise an end portion contacting the end section of the base portion, and a plurality of legs connecting the end portion and the seal. At least a subset of the one or more ridges may be upstanding from the inner surface of the legs.

Optionally, the cap may further comprise a cover portion formed of flexible, resilient (i.e. elastic) material to cover part of the outer surface of the member at an end of the member. The protective cap can be applied to the end of the member by manipulating (e.g. unfurling) at least part of the sheath from a non-gripping (e.g. gathered) configuration, such as a rolled-up configuration. The material of the cover portion may be selected to be one with a high co-efficient of friction. As the material is flexible, the cover portion may be manipulated (e.g. gathered, such as by being rolled up) before use into a non-gripping configuration and manipulated (e.g. unfurled) into a gripping configuration when the male connecting portion has been inserted into the insert portion, thereby gripping the pipe and securing the cap to the pipe. The cap may be removed from the elongate member by reversing the process. In either case, the manipulation may be done manually or by a mechanical process.

The insert portion may be a tubular element. It may be secured to an inwardly-facing surface of the base portion by frictional forces and/or by adhesive. The cover portion too may be a tubular element. The insert portion may be formed of the same material as the cover portion, or alternatively it may be formed of a different, e.g. more resilient material. The insert portion may be contiguous with the cover portion (e.g. such that the cover portion is supported from the inwardly-facing surface of the base portion by the inner portion), with the cover portion optionally extending out of the cavity, or alternatively it may not be contiguous. For example the cover portion may be attached to the rim of the rigid base portion, and not directly attached to the insert portion. In any case, the insert portion and cover portion may be said to be part of the same protective sheath.

In the non-gripping configuration, some or all of the cover portion may lie on the exterior surface of the base portion. Thus, in the non-gripping configuration, the sheath may: as the insert portion extend within the cavity; extend over the free edge of the base portion; and as the cover portion lie on the exterior surface of the base portion, e.g. extending back towards the end section of the base portion. If the base portion is substantially circular cylindrical, with the end section on an axis of the cylinder, the insert portion may extend in a first direction parallel to the axis towards the free edge of the base portion, and the cover portion may be positioned on the exterior surface of the base portion. When the cover portion is moved to the gripping configuration, the cover portion may extend from the free edge of the base portion in the first direction, towards the free edge of the cover portion.

The insert portion has an inner surface which is designed to cover an external surface of part of the male connection portion of the pipe, and the cover portion is designed to tightly grip and cover another portion of the external surface of the pipe.

If the elongate member is a threaded pipe, the insert portion may be designed to contact the threads of the pipe, thereby ensuring that the base portion covers and protects the threads; the cover portion is designed to grip a portion of the outer surface pipe adjacent to the threaded portion of the pipe. In this way, the male connecting portion of the pipe is protected when the protective cap is applied.

The protective cap may additionally comprise a further "retraction" portion designed to assist the user in removing the cap from the pipe after use. This retraction portion of material extends from the cover portion and does not grip the pipe as tightly as the cover portion. The retraction portion may therefore be in the form of a sheet-like element which lies against the surface of the pipe when the cover portion is unfurled, but does not grip the pipe as tightly as the sheath, and which the user can grasp more easily than the cover portion to remove the cap. Alternatively, the retraction portion may be formed of one or more ears that extend away from the pipe surface when the cover portion is unfurled, the ear(s) thereby acting as handles to assist the user in removing the protective cap.

A second aspect of the invention proposes, in general terms, that a protective member (protector), such as a cap (for example, of the type described above), for an end of an elongate member, such as a male connecting end of a pipe or tube, is provided with a chip for storing information regarding at least one property of the cap.

The at least one such property may comprise an identity number associated with the protective member. Alternatively or additionally, the at least one property may comprise a physical quantity associated with the protective member itself (e.g. a date on which it was manufactured, or a temperature of the protective member). Alternatively or additionally, at least one property may be a physical quantity associated with the environment of the protective member at the present location of the protective member (e.g. the environment's temperature (which may be identical to that of the protective member), the environment's humidity, or the protective member's geographical location). The properties may include properties at least one previous time, e.g. any one or more of a temperature of the protective member at a previous time, a temperature and/or humidity of the protective member's environment at a previous time, and/or a geographic location of the protective member at a previous time.

The chip may be capable of communicating with a reader device outside the cap to transmit the information to the reader device, e.g. in response to an interrogation signal generated by the reader device and recognized by the chip. The chip is provided within the protective member. For example, in the case that the end member is a protective cap of the type which comprises a base portion including an end section (e.g. a substantially flat wall) and a tubular wall (e.g. upstanding around a periphery of the end section) and thereby defines a cavity. The chip may be provided at least partly within the cavity.

For example, the cap may be provided with a RFID chip, located in a position in the cap where it is not damaged due to transport. Specifically, the RFID chip is provided located within the base portion (i.e. within the convex hull of the base portion), such as inserted into a cavity (hole) in the base portion, or even embedded into the material of the base portion so as to be permanently encased in it. The RFID chip having a memory for storing information regarding at least one property of the cap. In this way, manual inspections and manual handling of the protective cap may be reduced. The RFID chip may be further used to track the protective cap, for example when the cap is in transit between manufacturer and a site where the cap is to be deployed (e.g. an oil or gas rig). The RFID chip may interact with an apparatus for applying and removing the protective caps, as set out in patent application GB1909766.6.

Optionally, the cap may include one or more chips (which may be respective one(s) of the RFID chip(s), or provided within a common module with one or more of the RFID chip(s)) which is operative to generate visible light. Again these "LED chip(s)" are located within the base portion to avoid damage. The LED chips may be operative to generate a visible light signal upon one of the property or properties meeting a criterion. Optionally, the criterion may depend upon the values of at least one of the properties at multiple times (e.g. if one of the properties (e.g. humidity) is recorded as being above a threshold for more than a certain amount of time).

The base portion may include one or more through holes through which radio-frequency signals and/or visible light exit to the outside of the cap.

In particular, the RFID chip may interact with a robotic arm for applying and removing the caps, facilitating robotic handling of the protective caps. As a result, the efficiency of the transfer of protective caps between the manufacturer and a site where the protective caps are to be deployed may be increased. The financial burden associated with manual handling, application, and removal of the protective caps may be reduced.

Use of the robotic apparatus in conjunction with the RFID chip makes it possible for the protective cap to be applied to and/or removed from the end of the elongate member substantially without human involvement (except optionally in order to initiate the operation(s), and this may be performed remotely).

This may provide any of several advantages. First, the time taken in the operation(s) may be reduced compared to their performance by a human. Secondly, the accuracy of performing the operation(s) may be improved. Thirdly, since the human effort is reduced, the cost (e.g. as measured in man-hours) of the operation(s) may be reduced. In particular, using the apparatus the operation(s) may be performed in a region in which other operations are performed which are potentially dangerous to humans (such as a red zone) without a human entering it, and therefore with improved safety and/or without downtime to the other operation(s) being performed in that location.

Another expression of the invention is a method of applying a protective cap of any of the types described above to an elongate object and/or removing a protective cap from an elongate member.

A method for operating the cap to protect an outer surface of an elongate member, or more specifically a male connecting end of a pipe, may comprise two steps: inserting the end of the elongate member into the insert portion of the cap to ensure that the inner surface of the insert portion is in contact with the outer surface of the elongate member, and then manipulating (e.g. unfurling) the elastic cover portion of the cap from the non-gripping configuration into the gripping configuration so that the cover portion grips the elongate member and secures the cap to the male connecting end of the elongate member. The method may optionally further comprise removing the protective cap when protection is no longer needed.

In the case that the elongate member is a threaded pipe, the inserting step involves inserting the outwardly-facing threaded section of the pipe into the insert portion, thereby ensuring that the inner surface of the insert portion covers and protects the threads of the male connecting end of the pipe.

A method for removing the cap from the end of the elongate member comprises: manipulating (e.g. gathering, such as rolling back) the cover portion of the cap from the outer surface of the elongate member from the gripping configuration to the non-gripping configuration, using the retraction portion if present, and then removing the end of the elongate member from the insert portion.

Further aspects of the invention include a protective kit comprising one or more protective caps as defined above.

In general terms, a third aspect of the invention proposes a protective cap for an end of an elongate member, such as a male connecting end of a pipe or tube. The cap comprises a cover portion formed of flexible, resilient (i.e. elastic) material to cover part of the outer surface of the member at an end of the member. The protective cap can be applied to the end of the member by manipulating (e.g. unfurling) at least part of the sheath from a non-gripping (e.g. gathered) configuration, such as a rolled-up configuration. The material of the cover portion may be selected to be one with a high co-efficient of friction. As the material is flexible, the cover portion may be manipulated (e.g. gathered, such as by being rolled up) before use into a non-gripping configuration and manipulated (e.g. unfurled) into a gripping configuration when the male connecting portion has been inserted into the insert portion, thereby gripping the pipe and securing the cap to the pipe. The cap may be removed from the elongate member by reversing the process. In either case, the manipulation may be done manually or by a mechanical process.

If the elongate member is a pipe with a threaded outer surface, the protective cap can protect the pipe without being required to have a specific thread pattern that matches the thread pattern of the pipe. The protective cap can be attached to the pipe without applying a rotational motion to the protective cap, so there is reduced risk of damage to the user's shoulders and arms. Furthermore, the operation can typically be performed more quickly than applying or removing a conventional protector.

The protective cap comprises a base portion which is rigid (e.g. self-supporting, and, for a given unit volume, more resistant to deformation than the cover portion). The base portion comprises an end section (e.g. a substantially flat wall) and a tubular wall (e.g. upstanding around a periphery of the end section) and thereby defines a cavity. An insert portion of the protective cap is also provided, and is contained within the cavity of the base portion.

The insert portion may be a tubular element. It may be secured to an inwardly-facing surface of the base portion by frictional forces and/or by adhesive. The cover portion too may be a tubular element. The insert portion may be formed of the same material as the cover portion, or alternatively it may be formed of a different, e.g. more resilient material. The insert portion may be contiguous with the cover portion (e.g. such that the cover portion is supported from the inwardly-facing surface of the base portion by the inner portion), with the cover portion optionally extending out of the cavity, or alternatively it may not be contiguous. For example the cover portion may be attached to the rim of the rigid base portion, and not directly attached to the insert portion. In any case, the insert portion and cover portion may be said to be part of the same protective sheath.

In the non-gripping configuration, some or all of the cover portion may lie on the exterior surface of the base portion. Thus, in the non-gripping configuration, the sheath may: as the insert portion extend within the cavity; extend over the free edge of the base portion; and as the cover portion lie on the exterior surface of the base portion, e.g. extending back towards the end section of the base portion. If the base portion is substantially circular cylindrical, with the end section on an axis of the cylinder, the insert portion may extend in a first direction parallel to the axis towards the free edge of the base portion, and the cover portion may be positioned on the exterior surface of the base portion. When the cover portion is moved to the gripping configuration, the cover portion may extend from the free edge of the base portion in the first direction, towards the free edge of the cover portion.

The insert portion has an inner surface which is designed to cover an external surface of part of the male connection portion of the pipe, and the cover portion is designed to tightly grip and cover another portion of the external surface of the pipe.

If the elongate member is a threaded pipe, the insert portion may be designed to contact the threads of the pipe, thereby ensuring that the base portion covers and protects the threads; the cover portion is designed to grip a portion of the outer surface pipe adjacent to the threaded portion of the pipe. In this way, the male connecting portion of the pipe is protected when the protective cap is applied.

The protective cap may additionally comprise a further "retraction" portion designed to assist the user in removing the cap from the pipe after use. This retraction portion of material extends from the cover portion and does not grip the pipe as tightly as the cover portion. The retraction portion may therefore be in the form of a sheet-like element which lies against the surface of the pipe when the cover portion is unfurled, but does not grip the pipe as tightly as the sheath, and which the user can grasp more easily than the cover portion to remove the cap. Alternatively, the retraction portion may be formed of one or more ears that extend away from the pipe surface when the cover portion is unfurled, the ear(s) thereby acting as handles to assist the user in removing the protective cap.

The insert portion may comprise a set of one or more ridges upstanding from its inner surface. The ridges may take any shape (e.g. their cross-section transverse to a length direction of the ridges may be triangular or semi-circular). The ridges may be adjacent to each other on the inner surface of the insert portion, or they may be spaced-apart.

One can define a central axis which passes through the end section of the base portion, and threads through the insert portion and the cover portion. The ridges may encircle this central axis. The inner surface of the insert portion may be circularly symmetric around the central axis; further, the ridges on the circularly symmetric inner surface may themselves be circular. In other embodiments, the ridges may extend in a direction having a component parallel to the axis; for example they may be helical or may extend parallel to the axis of the cap.

The ridges may additionally be provided with a lubricant for dispersing on the outer surface of the elongate member; in particular, when the elongate member is a threaded pipe, the ridges on the inner surface of the insert portion are designed to coat the outwardly-facing threads of the pin end of the pipe in lubricant.

A method for operating the cap to protect an outer surface of an elongate member, or more specifically a male connecting end of a pipe, may comprise two steps: inserting the end of the elongate member into the insert portion of the cap to ensure that the inner surface of the insert portion is in contact with the outer surface of the elongate member, and then manipulating (e.g. unfurling) the elastic cover portion of the cap from the non-gripping configuration into the gripping configuration so that the cover portion grips the elongate member and secures the cap to the male connecting end of the elongate member.

In the case that the elongate member is a threaded pipe, the inserting step involves inserting the outwardly-facing threaded section of the pipe into the insert portion, thereby ensuring that the inner surface of the insert portion covers and protects the threads of the male connecting end of the pipe.

A method for removing the cap from the end of the elongate member comprises: manipulating (e.g. gathering, such as rolling back) the cover portion of the cap from the outer surface of the elongate member from the gripping configuration to the non-gripping configuration, using the retraction portion if present, and then removing the end of the elongate member from the insert portion.

A fourth aspect of the invention proposes in general terms, a protective bung for covering an inner surface of a hollow end portion of an elongate member. The end portion of the elongate member may be a female connecting end defining a cavity, and the elongate member may be a pipe or other tube. The bung comprises two portions: a male portion for insertion into the cavity, and a rim portion, which extends outwardly from the male portion, for covering an end surface (e.g. rim) of the elongate member. The bung includes ridges on the outer surface of the male portion; the ridges are designed to contact the inner surface of the female connecting end of the pipe.

If the elongate member is a threaded pipe, the male portion of the bung is designed to contact the threads of the pipe, thereby covering and protecting the threads. The rim portion is designed to cover and protect the rim of the pipe. In this way, the female connecting portion of the pipe is protected when the protective bung is applied.

The male portion may comprise a set of one or more ridges upstanding from its outer surface. The ridges may take any shape (e.g. their cross-section transverse to a length direction of the ridges may be triangular or semi-circular). The ridges may be adjacent to each other on the outer surface of the male portion, or they may be spaced-apart ridges.

One can define a central axis which threads through the male portion and the rim portion. If the male portion includes an end surface, the central axis may pass through this surface at an opposite end of the central axis from the rim portion. The ridges may encircle this central axis. An outer surface of the male portion may be circularly symmetric around the central axis; further, the ridges on the circularly symmetric outer surface may themselves be circular. In other embodiments, the ridges may extend in a direction having a component parallel to the axis; for example, they may be helical or may extend parallel to the axis of the bung.

The ridges may additionally be provided with a lubricant for dispersing on the inner surface of the elongate member; in particular, when the elongate member is a threaded pipe, the ridges on the outer surface of the male portion are designed to coat the inwardly-facing threads of the pin end of the pipe in lubricant.

The bung may comprise a handle which assists the user in grasping the bung to apply force to remove the bung from the cavity of the female connecting end of the pipe. Additionally, the protective bung may itself define a cavity, within which the handle is located. The handle may take any form, but in particular may include an arm or loop of material. It may be formed of the same material as the male portion of the bung, and may be integral with the male portion of the bung (i.e. forming a one-piece unit).

A method for operating the bung to protect the an inner surface of an elongate member, or more specifically a female connecting end of a pipe, comprises a step of inserting the male portion of the bung into the cavity so that the ridges and outer surface of the male portion contact the inner surface of the female connecting end, and the rim portion of the bung contacts the rim of the end of the pipe.

In the case that the pipe is a threaded pipe, the inserting step involves inserting the bung into the inwardly-facing threaded section of the pipe, thereby ensuring that the ridges and outer surface of the male portion covers and protects the threads of the female connecting end of the pipe.

A method for removing the bung from the male connecting end of the pipe comprises withdrawing the bung from the female connecting end of the pipe, using the handle if available.

Further aspects of the invention include a protective kit comprising one or more protective caps and bungs as defined above.

Furthermore, a method for protecting a pipe includes positioning a protective cap as defined above to a male end of a pipe, and bung as defined above to a female end of the pipe. The method may comprise removing the pipe and bung when protection is no longer needed.

In general terms, a fifth aspect of the invention proposes a protective cap for an end of an elongate member, such as a male connecting end of a pipe or tube. The cap comprises a sheath of flexible, resilient (i.e. elastic) material to cover part of the outer surface of the member at an end of the member. The protective cap can be applied to the end of the member by unfurling at least part of the sheath from a gathered configuration, such as a rolled-up configuration. The material of the sheath may be selected to be one with a high co-efficient of friction.

If the elongate member is a pipe with a threaded outer surface, the protective cap can protect the pipe without being required to have a specific thread pattern that matches the thread pattern of the pipe. The protective cap can be attached to the pipe without applying a rotational motion to the protective cap, so there is reduced risk of damage to the user's shoulders and arms. Furthermore, the operation can typically be performed more quickly than applying or removing a conventional protector.

The protective cap comprises a base portion which is rigid (e.g. self-supporting, and more resistant to deformation than the sheath). The base portion comprises an end section (e.g. a substantially flat wall) and a tubular wall (e.g. upstanding around a periphery of the end section) and thereby defines a cavity. An insert portion of the sheath is contained within the cavity of the base portion, with a cover portion of the sheath extending out of the cavity. The insert portion has an inner surface which is designed to cover an external surface of part of the male connection portion of the pipe, and the cover portion is designed to tightly grip and cover another portion of the external surface of the pipe. As the material is flexible, the cover portion may be gathered (e.g. rolled up) before use and unfurled when the male connecting portion has been inserted into insert portion, thereby gripping the pipe and securing the cap to the pipe.

If the elongate member is a threaded pipe, the insert portion may be designed to contact the threads of the pipe, thereby ensuring that the base portion covers and protects the threads; the cover portion is designed to grip a portion of the outer surface pipe adjacent to the threaded portion of the pipe. In this way, the male connecting portion of the pipe is protected when the protective cap is applied.

The sheath of the protective cap may additionally comprise a further "retraction" portion designed to assist the user in removing the cap from the pipe after use. This retraction portion of material extends from the cover portion and does not grip the pipe as tightly as the cover portion. The retraction portion may therefore be in the form of a sheet-like element which lies against the surface of the pipe when the cover portion is unfurled, but does not grip the pipe as tightly as the sheath, and which the user can grasp more easily than the cover portion to remove the cap. Alternatively, the retraction portion may be formed of one or more ears that extend away from the pipe surface when the cover portion is unfurled, the ear(s) thereby acting as handles to assist the user in removing the protective cap.

The insert portion may comprise a set of one or more ridges upstanding from its inner surface. The ridges may take any shape (e.g. their cross-section transverse to a length direction of the ridges may be triangular or semi-circular). The ridges may be adjacent to each other on the inner surface of the insert portion, or they may be spaced-apart.

One can define a central axis which passes through the end section of the base portion, and threads through the insert portion and the cover portion. The ridges may encircle this central axis. The inner surface of the insert portion may be circularly symmetric around the central axis; further, the ridges on the circularly symmetric inner surface may themselves be circular. In other embodiments, the ridges may extend in a direction having a component parallel to the axis; for example they may be helical or may extend parallel to the axis of the cap.

The ridges may additionally be provided with a lubricant for dispersing on the outer surface of the elongate member; in particular, when the elongate member is a threaded pipe, the ridges on the inner surface of the insert portion are designed to coat the outwardly-facing threads of the pin end of the pipe in lubricant.

A method for operating the cap to protect an outer surface of an elongate member, or more specifically a male connecting end of a pipe, may comprise two steps: inserting the end of the elongate member into the insert portion of the cap to ensure that the inner surface of the insert portion is in contact with the outer surface of the elongate member, and then unfurling the elastic cover portion of the cap so that the cover portion grips the elongate member and secures the cap to the male connecting end of the elongate member.

In the case that the elongate member is a threaded pipe, the inserting step involves inserting the outwardly-facing threaded section of the pipe into the insert portion, thereby ensuring that the inner surface of the insert portion covers and protects the threads of the male connecting end of the pipe.

A method for removing the cap from the end of the elongate member comprises: gathering (e.g. rolling back) the cover portion of the cap from the outer surface of the elongate member, using the retraction portion if present, and then removing the end of the elongate member from the insert portion.

A sixth aspect of the invention proposes in general terms, a protective bung for covering an inner surface of a hollow end portion of an elongate member. The end portion of the elongate member may be a female connecting end defining a cavity, and the elongate member may be a pipe or other tube. The bung comprises two portions: a male portion for insertion into the cavity, and a rim portion, which extends outwardly from the male portion, for covering an end surface (e.g. rim) of the elongate member. The bung includes ridges on the outer surface of the male portion; the ridges are designed to contact the inner surface of the female connecting end of the pipe.

If the elongate member is a threaded pipe, the male portion of the bung is designed to contact the threads of the pipe, thereby covering and protecting the threads. The rim portion is designed to cover and protect the rim of the pipe. In this way, the female connecting portion of the pipe is protected when the protective bung is applied.

The male portion may comprise a set of one or more ridges upstanding from its outer surface. The ridges may take any shape (e.g. their cross-section transverse to a length direction of the ridges may be triangular or semi-circular). The ridges may be adjacent to each other on the outer surface of the male portion, or they may be spaced-apart ridges.

One can define a central axis which threads through the male portion and the rim portion. If the male portion includes an end surface, the central axis may pass through this surface at an opposite end of the central axis from the rim portion. The ridges may encircle this central axis. An outer surface of the male portion may be circularly symmetric around the central axis; further, the ridges on the circularly symmetric outer surface may themselves be circular. In other embodiments, the ridges may extend in a direction having a component parallel to the axis; for example they may be helical or may extend parallel to the axis of the bung.

The ridges may additionally be provided with a lubricant for dispersing on the inner surface of the elongate member; in particular, when the elongate member is a threaded pipe, the ridges on the outer surface of the male portion are designed to coat the inwardly-facing threads of the pin end of the pipe in lubricant.

The bung may comprise a handle which assists the user in grasping the bung to apply force to remove the bung from the cavity of the female connecting end of the pipe. Additionally, the protective bung may itself define a cavity, within which the handle is located. The handle may take any form, but in particular may include an arm or loop of material. It may be formed of the same material as the male portion of the bung, and may be integral with the male portion of the bung (i.e. forming a one-piece unit).

A method for operating the bung to protect the an inner surface of an elongate member, or more specifically a female connecting end of a pipe, comprises a step of inserting the male portion of the bung into the cavity so that the ridges and outer surface of the male portion contact the inner surface of the female connecting end, and the rim portion of the bung contacts the rim of the end of the pipe.

In the case that the pipe is a threaded pipe, the inserting step involves inserting the bung into the inwardly-facing threaded section of the pipe, thereby ensuring that the ridges and outer surface of the male portion covers and protects the threads of the female connecting end of the pipe.

A method for removing the bung from the male connecting end of the pipe comprises withdrawing the bung from the female connecting end of the pipe, using the handle if available.

Further aspects of the invention include a protective kit comprising one or more protective caps and bungs as defined above.

Furthermore, a method for protecting a pipe includes positioning a protective cap as defined above to a male end of a pipe, and bung as defined above to a female end of the pipe. The method may comprise removing the pipe and bung when protection is no longer needed.

BRIEF DESCRIPTION OF THE FIGURES

Embodiments of the invention will now be described for the sake of example only with reference to the following drawings in which.

DETAILED DESCRIPTION OF THE EMBODIMENTS

Figure 1:
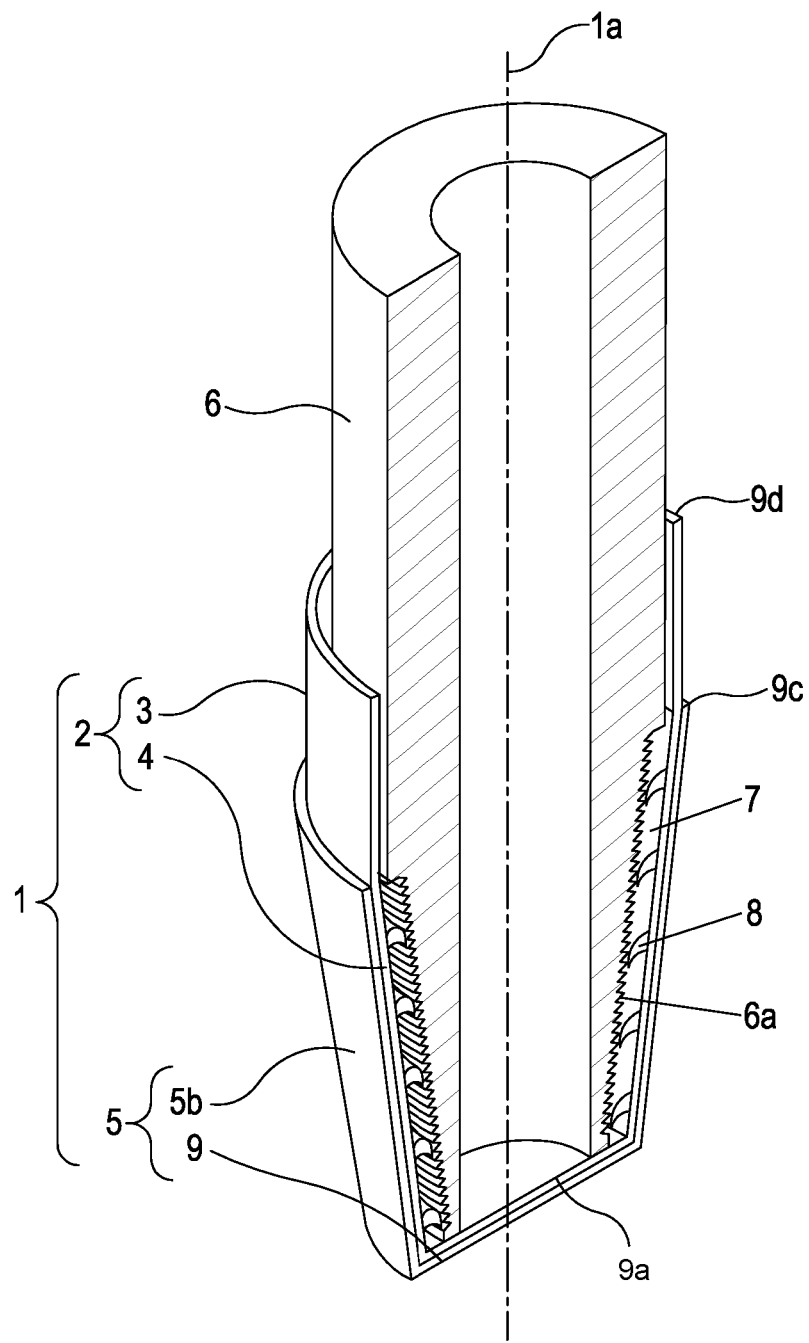
FIG. 1 is a cross-sectional diagram showing a protective cap which is an embodiment of the invention, covering the male connecting end of a drill pipe.

Referring first to FIG. 1, a protective cap 1 is shown comprising a sheath of flexible, resilient material 2 and a rigid base portion 5. The rigid base portion 5 has a tubular wall 5b upstanding from an end section (end wall) 9. The tubular wall 5b has a free edge 9c furthermost from the end section 9 of the base portion 5. The protective cap 1 covers a male connecting end of a drill pipe 6 with an outwardly facing threaded section 6a. That is, the protective cap 1 is shown in a gripping configuration, gripping the pipe 6. The protective cap 1 is circularly symmetric about a central axis 1a which is coincident with a central axis of the pipe 6.

The base portion 5 is formed of a rigid material and defines a cavity. The base portion 5 therefore also covers the threaded section of the pipe 6, and, as noted, is of a rigid material so as to protect the vulnerable outwardly facing threads 6a from deformation which may occur during the transport or storage of the drill pipe 6.

Figure 2:
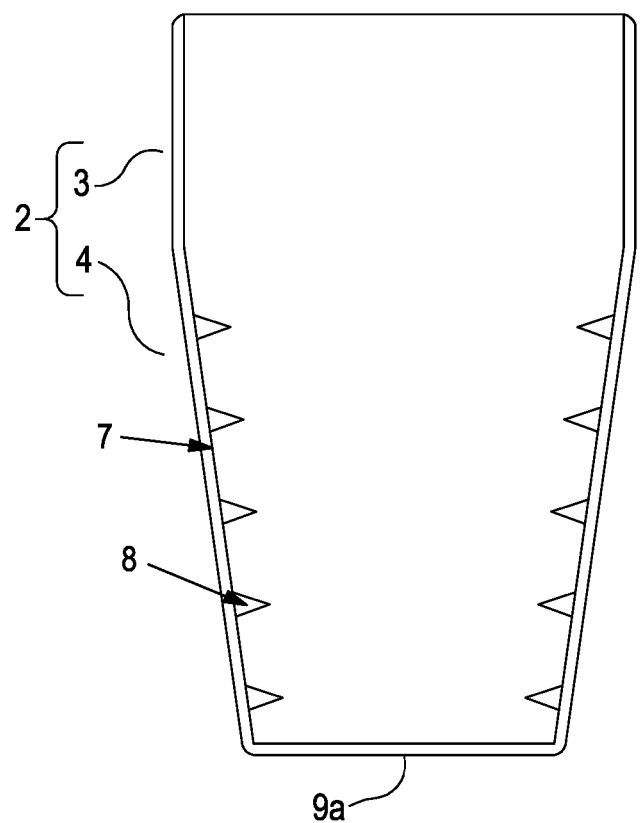
FIG. 2 is a cross-sectional diagram showing the sheath of flexible material of the protective cap shown in FIG. 1, operative to cover a male connecting end of a drill pipe.

The sheath 2, shown in isolation in FIG. 2, is composed of two portions: an insert portion 4 for inserted into the cavity in the base portion 5, and a cover portion 3 which is not inserted into the base portion 5. In this embodiment, the sheath 2 is a single tubular member, and the insert portion 4 and cover portion 3 are respective tubular portions of this tubular member. The insert portion 4 may be attached to the base portion 5 by adhesive and/or be maintained there by frictional contact with the inwardly-facing surface of the base portion. The cover portion 3 is supported from the inwardly facing surface of the base portion 5, via the insert portion 4. In the gripping configuration the cover portion 3 extends away from the free edge 9c of the base portion towards a free edge 9d of the cover portion 3. The inner surface 7 of the insert portion 4 is designed to cover the outwardly facing threaded section 6a of the pipe 6. As shown in the figure, the insert portion 4 may have one or more ridges 8 on its inner surface 7. The cover portion 3 is operative to grip the threaded portion 6a of the outer surface of the pipe 6. The sheath of this embodiment contains an end wall 9a which lies against the end section (end wall) 9 of the rigid base portion 5.

The male connecting portion of a drill pipe 6 is termed the 'pin end' of the pipe. The threaded section 6a of a pin end of a drill pipe is often tapered, as can be seen in FIG. 1. The insert portion 4 of a protective cap 1 for drill pipes is tapered accordingly, as shown in FIGS. 1 and 2. The cover portion 3 is a laminar (i.e. sheet-like, but not flat) portion which can be collected (e.g. rolled up) into a non-gripping, e.g. gathered, configuration before application of the cap 1 onto the end of the drill pipe 6. When the end of the pipe 6 is inserted into the insert portion 4, the gathered cover portion 4 can be unfurled (e.g. unrolled) in order to grip and secure the cap 1 onto the pipe 6.

The insert portion 4 has an inner surface 7 which from which optionally ridges 8 may extend inwardly. These ridges 8 may either be spaced apart, as shown in the diagram, or they may be adjacent to each other. The ridges 8 are also optionally provided with a lubricant which covers the threaded section 6a of the pipe 6.

The cover portion 3 can be manipulated into a non-gripping configuration by gathering it (e.g. rolling it, into roll having a spiral cross-section) away from the surface of the pipe 6. In the non-gripping configuration it applies no force, or a much reduced force, the surface of the pipe 6.

For example, the cover portion 3 may be positioned in a roll over the exterior surface of the tubular wall 5b. Alternatively, the cover portion 3 may be positioned on the exterior surface of the tubular wall 5b in an un-rolled configuration, such that it projects back from the free edge 9c in the direction towards the end section 9 of the base portion 5. In either case, the cover portion 3 may be maintained in the non-gripping configuration by its own resilience. To make this more likely, the base portion 5 may have a generally decreasing cross-section (transverse to the axis 1a of the pipe 6) in the axial direction which is from the free edge 9c towards the end section 9 of the base portion 5 (i.e. the direction into the cavity).

Figure 3:
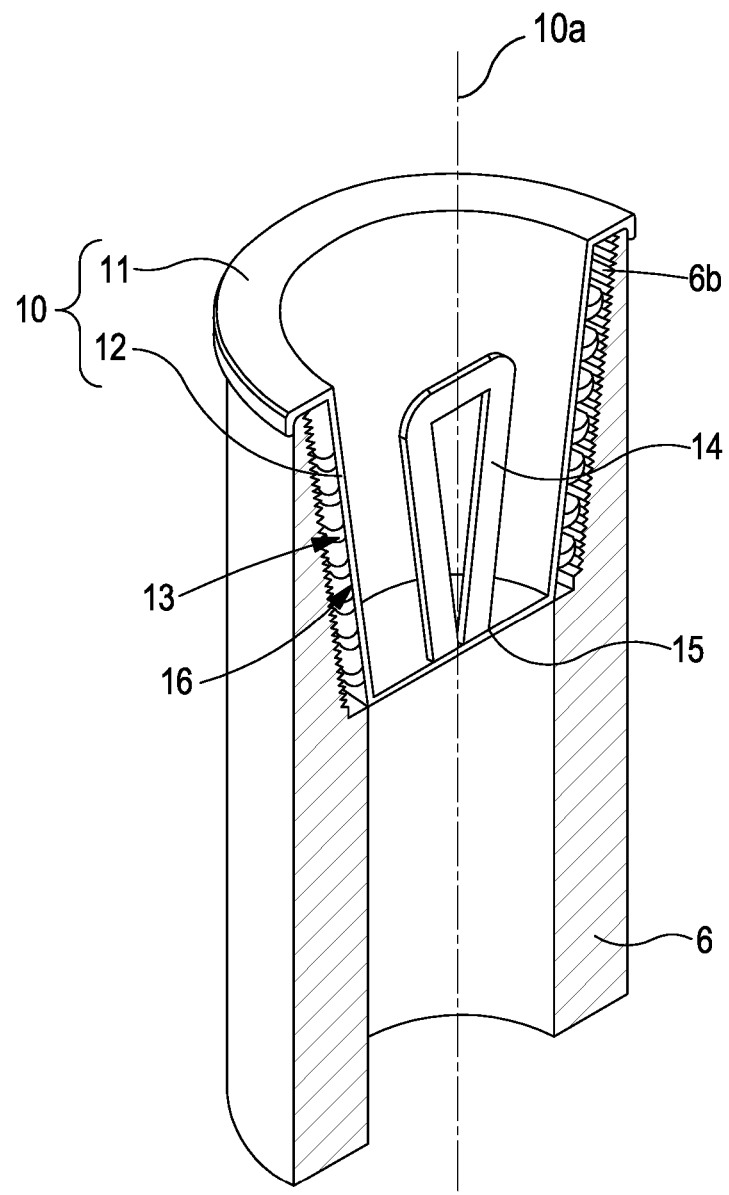
FIG. 3 is a cross-sectional diagram showing a protective bung which is a second embodiment of the invention, covering the female connecting end of a drill pipe.

Turning to FIG. 3, a second embodiment of the invention is shown, which is a bung 10 for insertion into a hollow end portion of an elongate member, such as the female end of an oil pipe 6, is shown. The bung 10 may be formed as from a flexible, resilient material, e.g. as an integral (one-part) body. The bung 10 includes a male portion 12 for insertion into a cavity within the hollow portion of the elongate member, and a rim portion 11 extending outwardly from one end of the male portion 12. In use, the rim portion 11 is positioned lying against the end surface of the elongate member. The male portion 12 is formed with an end section (circular wall) 15, and (e.g. circular) ridges 13 extending outwardly from its surface 16. The ridges each encircle the axis 10a. Note that in variations, the ridges 13 need not all extend fully around the axis, but instead one or more ridges may subtend an angle around the axis 10a of less than 360 degrees. Optionally, the ridges collectively encircle the ridge 10a, in the sense that, for each angle about the axis 10a, at least one of the ridges includes a portion at that angle about the axis 10a.

In the case that the elongate member is a drill pipe 6 with a tapered inwardly facing threaded section 6b, the ridges 13 are designed to contact the inwardly facing threaded section 6b of the pipe 6. A handle 14 is positioned within the bung 10, attached to the end section 15. In this second embodiment, the handle is formed as a loop, e.g. with both ends of the loop joined to the end section 15. Apart from the handle 14, the bung 10 is circularly symmetric about the central axis 10a.

Figure 4:
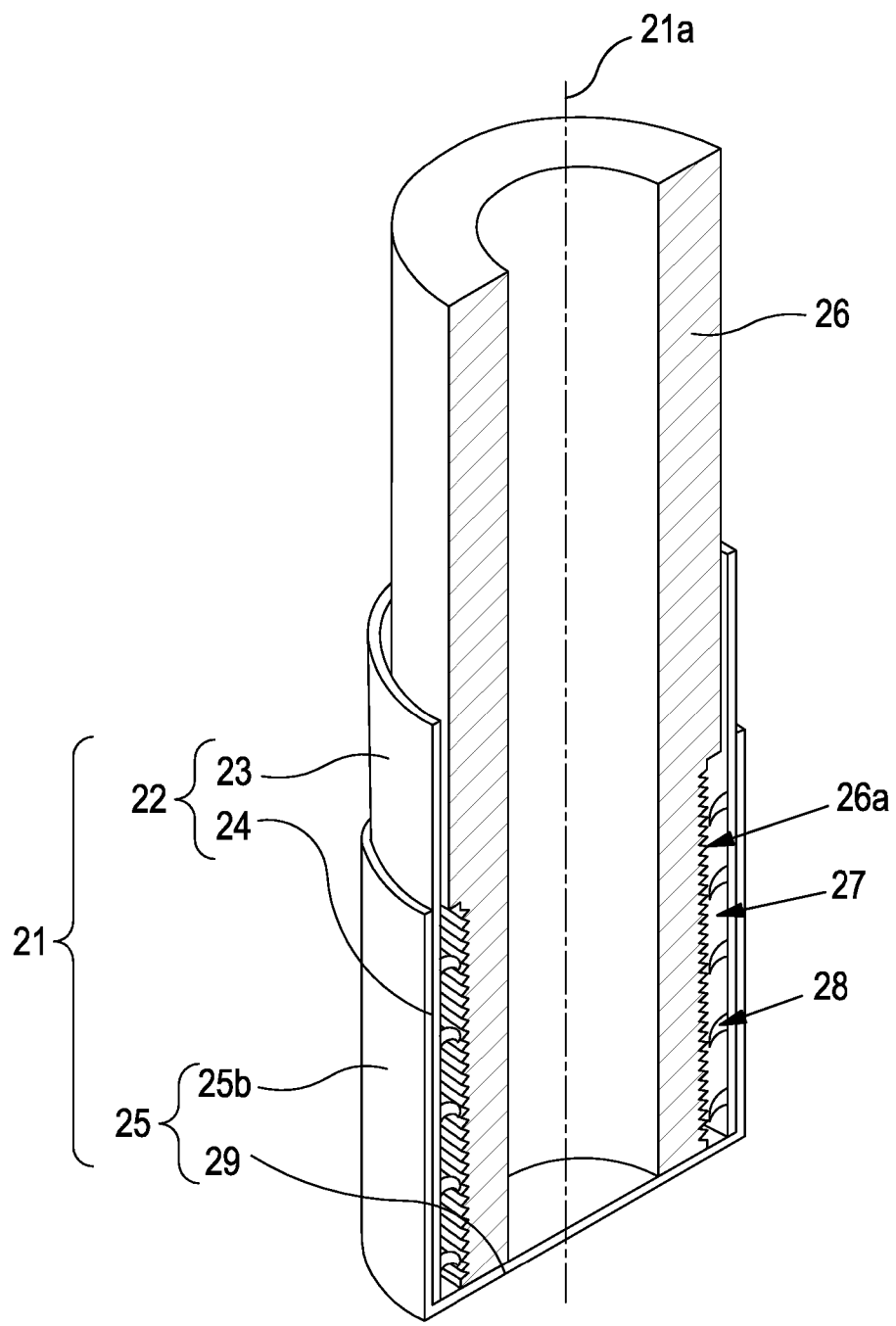
FIG. 4 is a cross-sectional diagram showing a protective cap which is a third embodiment of the invention, covering a male connecting end of a casing pipe.

FIG. 4 shows a third embodiment of the invention, which is another protective cap 21. Elements of the third embodiment corresponding to elements of the first embodiment are shown by reference numerals 20 higher. The protective cap 21 differs from the cap 1 in that the rigid base portion 25 and the inner portion 24 of the sheath 22 have a cylindrical form (i.e. a cross-section transverse to a central axis 21a which is a circle of the same diameter at a range of positions along the central axis 21a of the cap. The cap 21 is for use on the end of a pipe 26 which does not have a tapered end portion (which is typical of a casing pipe), but which may have a threaded outwardly-facing surface 26a at an end portion of the pipe 26. This threaded portion is inserted into the insert portion 24 of the sheath 22 when the cover portion 23 is rolled up, and then cover portion is then unrolled. To remove the pipe 26, the cover portion 23 is rolled up again, and the threaded portion 26a is removed from the insert portion 24 of the sheath 22.

As shown in FIG. 4, the sheath 22 of this embodiment does not include an end wall corresponding to the end wall 9a of the first embodiment; instead, the end of the male portion of the pipe 26 is protected by the end wall 29 of the rigid base portion 25. However the lack of an end wall is not an essential feature for a protective cap for a pipe 26 which does not have a tapered end portion. A cap for a pipe 26 may have an insert portion with an end wall, and equally a cap for a pipe 6 with a tapered end portion may have an insert portion without an end wall 9a.

The cover portion of the protective caps 1, 21 may include one or more retraction portions (not shown), such as ears of material extending from their cover portion. The retraction portion is designed to assist the user in removing the cap from the male connecting end of the elongate member by providing a portion that is easier to grasp than the cover portion of the cap.

Figure 5:
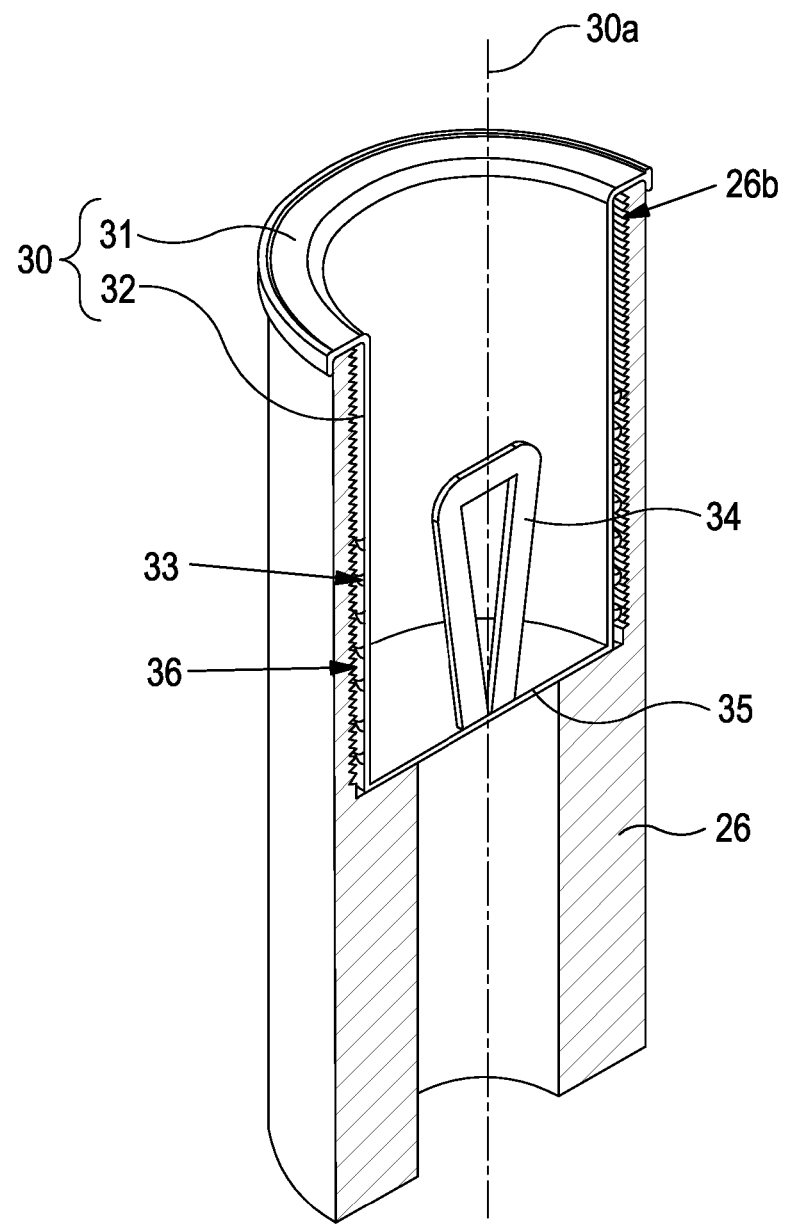
FIG. 5 is a cross-sectional diagram showing a protective bung which is a fourth embodiment of the invention, covering a female connecting end of a casing pipe.

FIG. 5 shows a fourth embodiment of the invention, which is a bung 30 for insertion into a cavity defined by a hollow end portion of an elongate member, such as a pipe 26. Elements with the same significance as in FIG. 3 are given reference numerals 20 higher. The bung 30 differs from the bung 10 of FIG. 3 only in that the male portion 32 has a uniform cross-section transverse to a central axis 30a at a range of positions along the central axis. The bung 30 is for use on the end of a pipe 26 which does not have a tapered end portion (which is typical of a casing pipe), but which may have a threaded inwardly-facing surface 26b at an end portion of the pipe 26.

Attention will now be turned towards further embodiments of the protective cap, in particular different forms the cover portion may take. The cap embodiments listed so far have all comprised a cover portion which may be unfurled (manipulated) from a gathered configuration (non-gripping configuration) so as to grip a portion of the outer surface of the elongate member, i.e. unfurled from a gathered configuration to a gripping configuration. The above embodiments have also comprised a cover portion which is contiguous with the insert portion. However, the cover portion may take other forms which are manipulated in different ways (i.e. do not necessarily lie in a 'gathered' configuration before use and are not necessarily 'unfurled') to grip the outer surface of the elongate member.

Figure 6A:
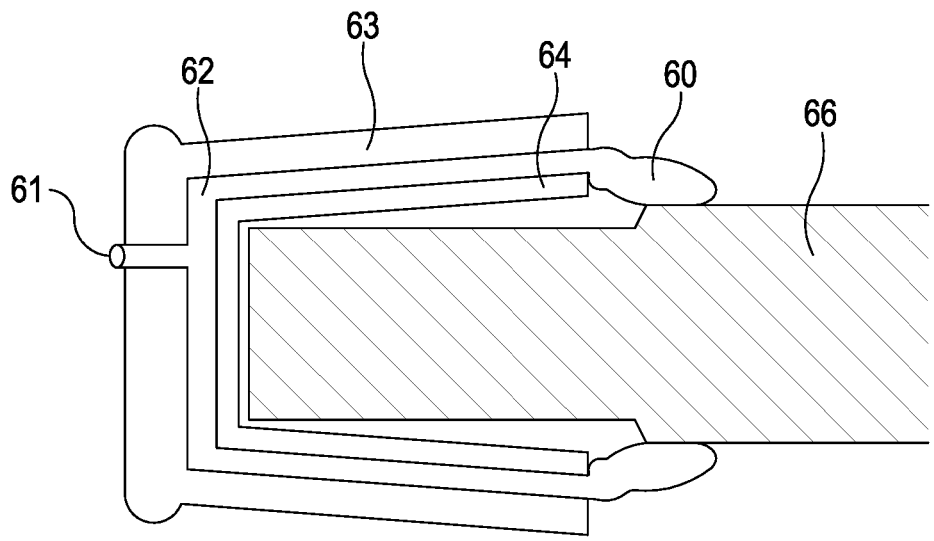
FIG. 6A-6B are cross-sectional diagrams showing a protective cap which is a fifth embodiment of the invention, with an alternate 'balloon'-like cover portion.
Figure 6B:
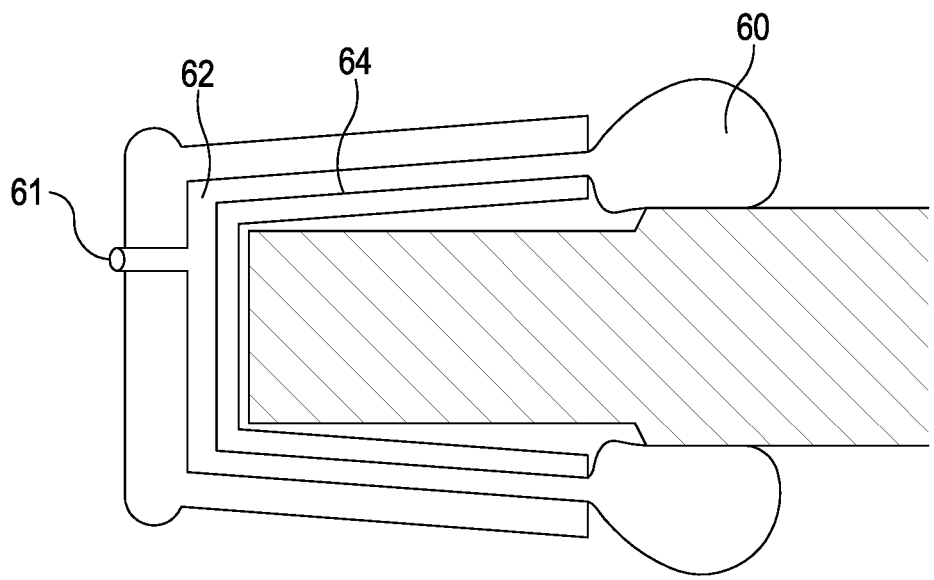

FIGS. 6A and 6B show a cross section of a first example of an alternative cover portion, wherein the cover portion is an inflatable hollow portion 60 of resilient material which may be inflated, like a balloon, so as to expand and apply pressure to the outer surface of a portion of the elongate member, thereby gripping the outer surface and securing the cap to the elongate member 66.

A protective cap of this embodiment is provided with an airtight valve 61 on the base portion 63. The valve may be provided on the end section of the base portion 63, as shown in FIGS. 6A and 6B, or on the tubular wall of the base portion 63. The valve 61 is connected to a duct 62 leading to the hollow cover portion 60. The duct 62 may be disposed within the base portion 63, or between the insert portion 64 and the base portion 63, or within the insert portion 64 itself. The hollow cover portion 60 may be partitioned into multiple hollow cavities or 'balloons' along the circumference of the cap, or there may only be one hollow cavity of the cover portion. In the case that the cover portion comprises multiple connected 'balloons', each 'balloon' has a corresponding duct leading from the valve to the 'balloon'.

When the cap is applied to the end of the elongate member 66 and the valve 61 is opened, air may be pumped into the duct, and the cover portion 60 can be inflated from its non-gripping configuration, shown in FIG. 6A to its gripping configuration, shown in FIG. 6B. To remove a cap, with the cover portion 60 in the gripping configuration, the valve 61 is opened and the air is released, either passively or by inverting the pump, reducing the pressure applied by the cover portion to the outer surface of the elongate member 66. This returns the cover portion 60 to the non-gripping configuration and allows the cap to be removed from the end of the elongate member 66.

Figure 6C:
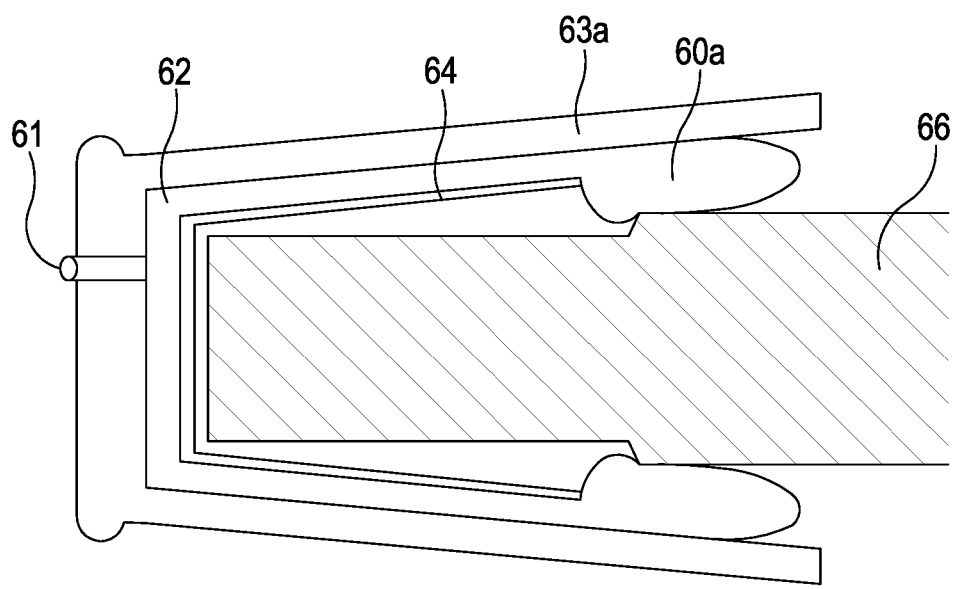
FIG. 6C is a cross-sectional diagram showing a protective cap which is a sixth embodiment of the invention, with an alternate 'balloon'-like cover portion and an extended base portion.

FIG. 6C shows another embodiment which is a further example of the 'balloon' cover portion, wherein hollow cover portion 60a is disposed between an extended hard base portion 63a and the elongate member 66. The embodiment of FIG. 6C has an insert portion 64. The base portion 63a resists the expansion of the hollow cover portion 60a which results in a greater force applied by the cover portion 60a to the elongate member 66.

Figure 7A:
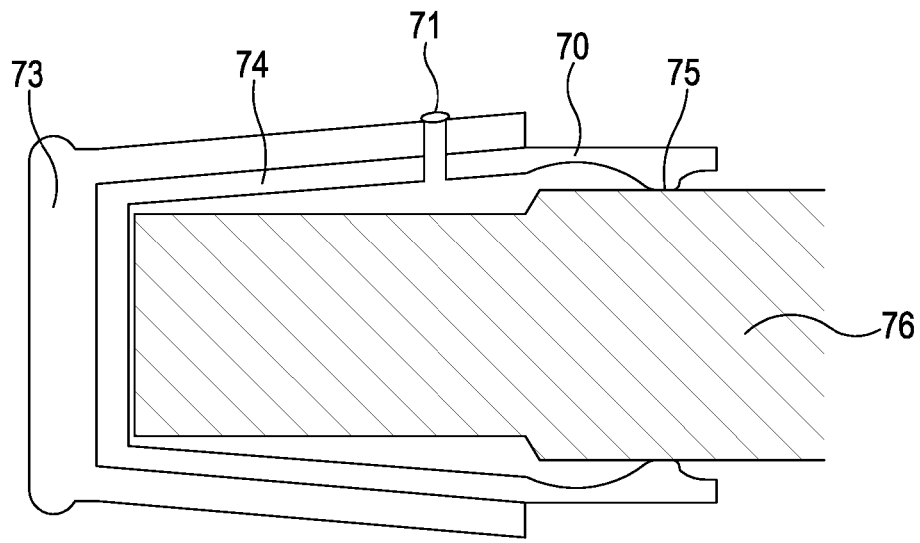
FIGS. 7A and 7B are cross-sectional diagrams showing a protective cap which is a seventh embodiment of the invention, with an alternate 'vacuum' cover portion.
Figure 7B:
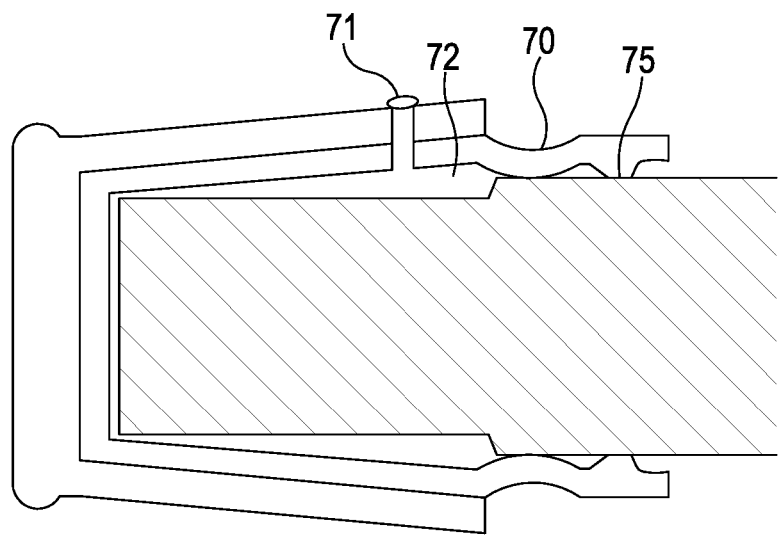

FIGS. 7A and 7B show a cross section of a second example of an alternative cover portion, wherein the cover portion 70 has a lip 75. The lip may be reliantly urged against the outer surface of the elongate member 76, as shown in FIG. 7A, preferably so as to provide an airtight seal encircling the elongate member 76. Also present in this embodiment is an airtight valve 71 on the base portion 73 of the protective cap. As shown in the figure this valve 71 may be located on the tubular wall of the base portion 73. Through this valve 71 the air between the protective cap and the elongate member 76 is pumped out thereby creating a vacuum 72 within the cap, manipulating (deforming) the cover portion and securing the cap to the elongate member with the vacuum pressure, as shown in FIG. 7B. The valve 71 is opened in order to release this pressure and to allow the protective cap to be removed from the end of the elongate member 76. In this embodiment, the insert portion 74 may be operative to at least cover the end section of the base portion of the protective cap and to act as a seal.

As a further point, the feature that the insert portion is positioned to cover the end section of the base portion (and indeed the entire interior surface of the base portion) is not essential to this embodiment, and the insert portion may alternatively cover any proportion of the inner surface of the base portion.

Figure 8A:
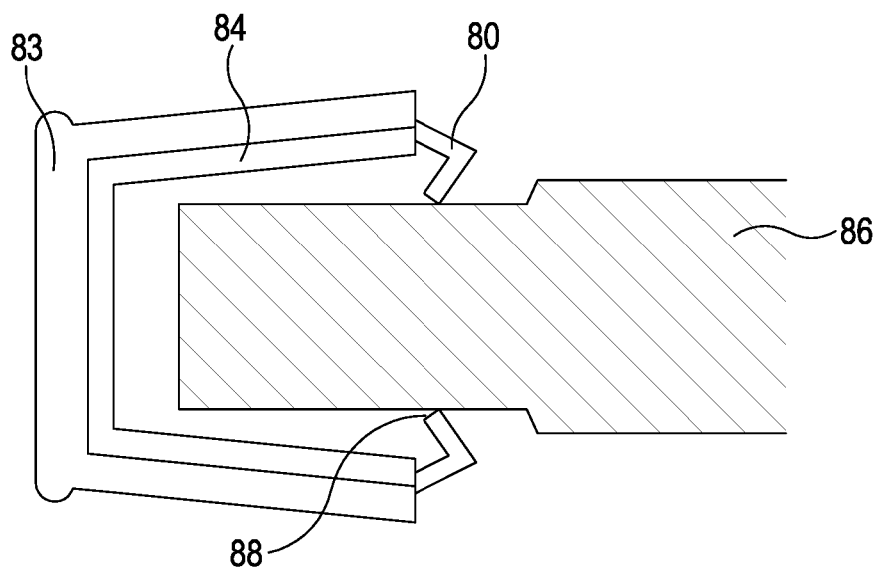
FIG. 8A-8D are cross-sectional diagrams showing a protective cap which is an eighth embodiment of the invention, with an alternate folded cover portion.
Figure 8B:
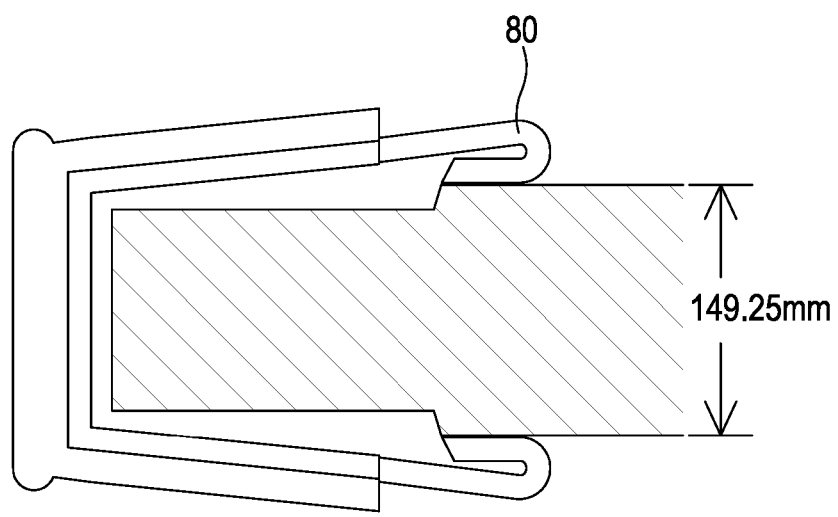
Figure 8C:
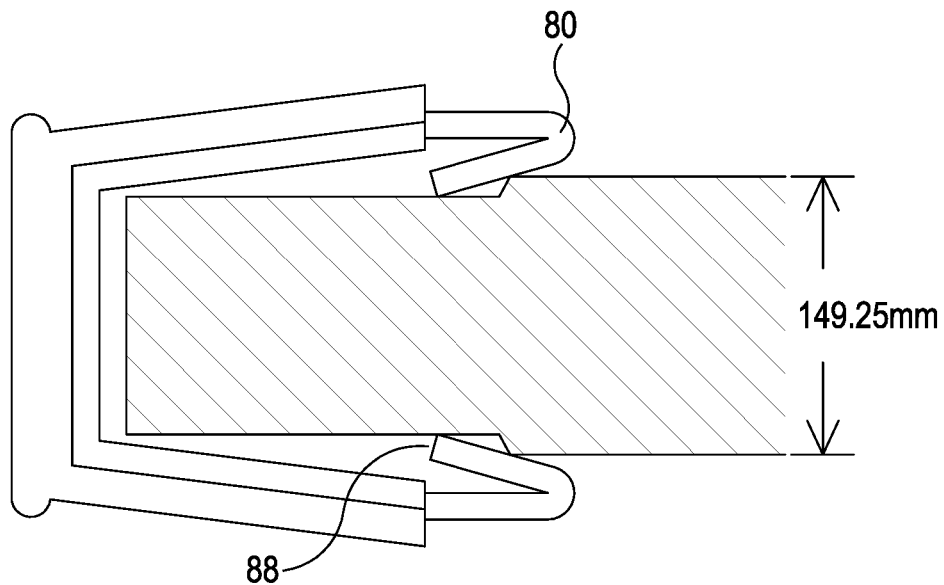
Figure 8D:
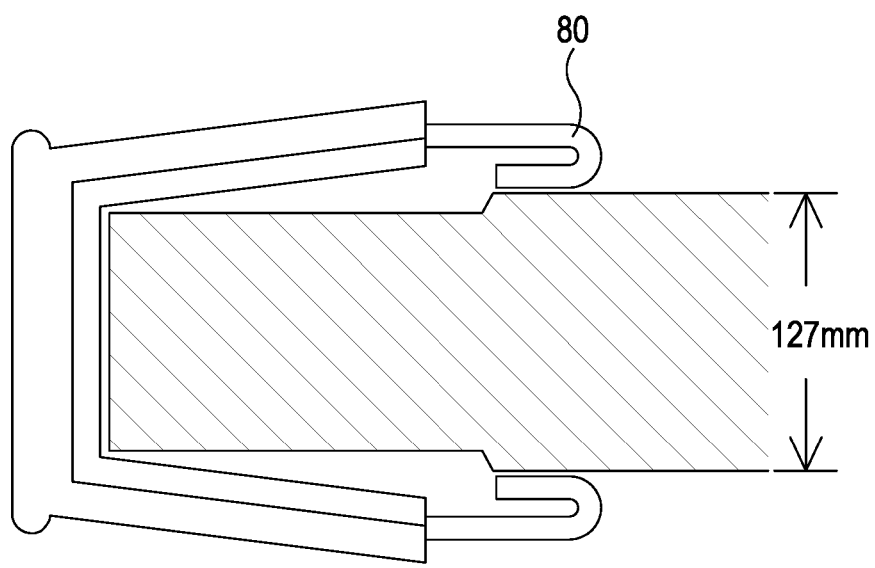

FIGS. 8A-D show a cross section of a third example of an alternative cover portion. The embodiment of FIGS. 8A-D has a base portion 83 and an insert portion 84. The embodiment further comprises a cover portion 80 which is optionally contiguous with the insert portion 84 and/or attached to the base portion 83 directly, e.g. with adhesive. As shown in FIG. 8A, when the cover portion 80 is in its non-gripping configuration there is a fold in the middle of its length (i.e. at a location intermediate between the base portion 83 and the free edge 88 of the cover portion 80), such that the cross-section of the cover portion 80 forms a V-like shape. Thus, the free edge of the cover portion projected in the state in a direction diagonally towards the center of the cap (i.e. towards the axis of the elongate member 86, when the elongate member is inserted into the cap). As can be seen in FIGS. 8B-8D, when the cap is applied to the elongate member 86, the cover portion 80 is forced against itself, compressing the V-like shape into its gripping configuration and securing the cover portion (and hence the cap) to the elongate member 86. As will be described in greater detail later, one protective cap can be employed to protect an elongate member with any diameter in a range of outer diameters (O.D.). The angle of the fold in the gripping configuration will be different depending on the diameter of the elongate member 86, as can be seen by comparing FIGS. 8B and 8D, in which the elongate member 86 has a smaller diameter than in FIG. 8B. Note that as shown in FIG. 8C, the cover portion 80 may be such that the fold is substantially equidistant from the base portion 83 and the free edge of the cover portion, so that in the gripping position the free edge of the cover portion 80 may be very close to the junction of the base portion 83 and the insert portion 84.

Figure 9A:
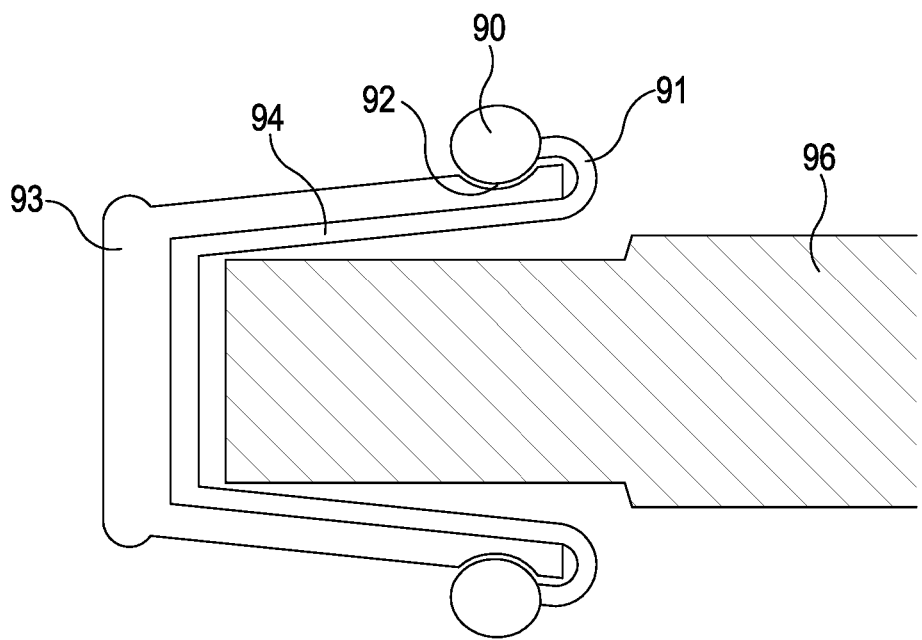
FIG. 9A-9B are cross-sectional diagrams showing a protective cap which is a ninth embodiment of the invention, with an alternate elastic band cover portion.
Figure 9B:
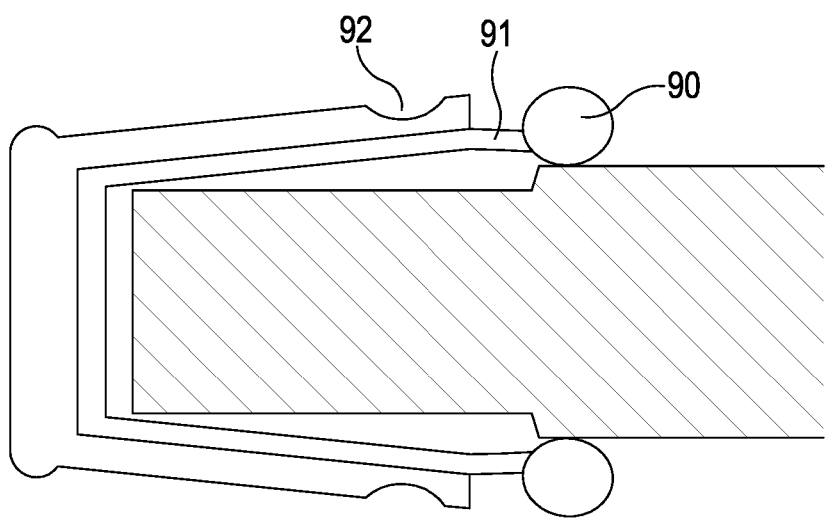

FIGS. 9A and 9B show a cross section of a fourth example of an alternative cover portion. The cover portion in this embodiment comprises a band of resilient (elastic) material 90 attached to the protective cap by a connector portion 91 which is contiguous with an insert portion 94 of the sheath. As shown in FIG. 9A, the band 90 sits in a groove 92 etched into the outer surface of the base portion 93 when the cover portion is in the non-gripping configuration. Thus, in the non-gripping configuration, the band 90 is secured in the groove 92 of the base portion 93 by its own radial elastic force. FIG. 9B shows the cover portion once it has been manipulated into the gripping configuration. As shown in FIG. 9B, when the cover portion has been manipulated into the gripping configuration, the elastic band 90 of the cover portion encircles the elongate member 96 and exerts the radial elastic force against the elongate member 96, securing the protective cap to the elongate member. The band 9D may be comprised of a less elastic material than the connecter 91, or it may be the same material. In the case that it is the same material the high elastic force provided by the band 90 is therefore due to its size. In either case, the cover portion 91 has a higher elasticity per unit length at the band 90 (i.e. at a position further spaced from the base portion 93 in the gripping configuration) than where it meets the edge of the base portion 93.

FIGS. 10A-10D show two examples of an alternative type of cover portion, wherein the protective cap comprises an additional mount 100, 100*a* and the cover portion extends from the base portion at one end and is coupled to the mount 100, 100*a* at the other end.

Figure 10A:
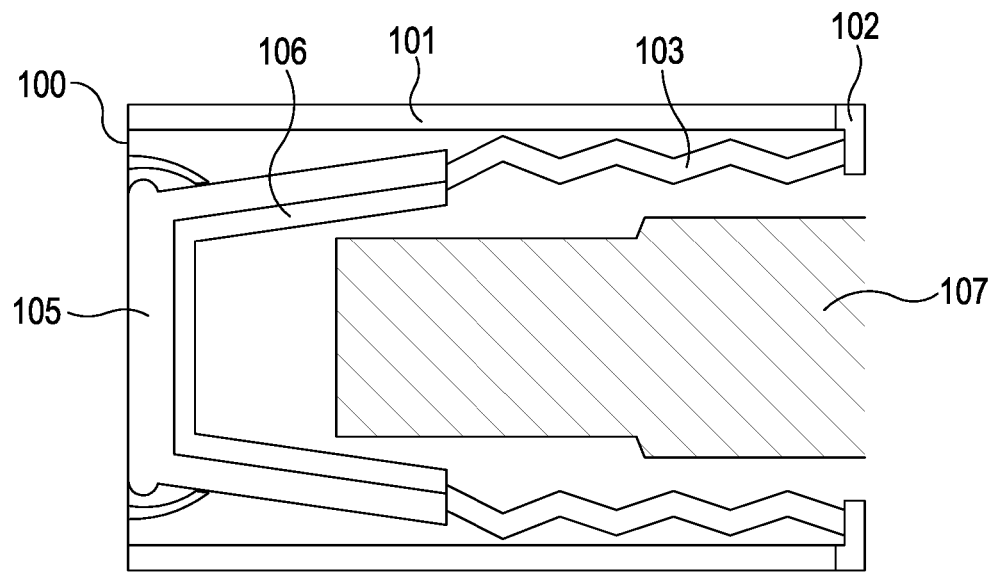
FIG. 10A-10B are cross-sectional diagrams showing a protective cap which is a tenth embodiment of the invention, wherein the cap comprises an additional mount for the cover portion.
Figure 10B:
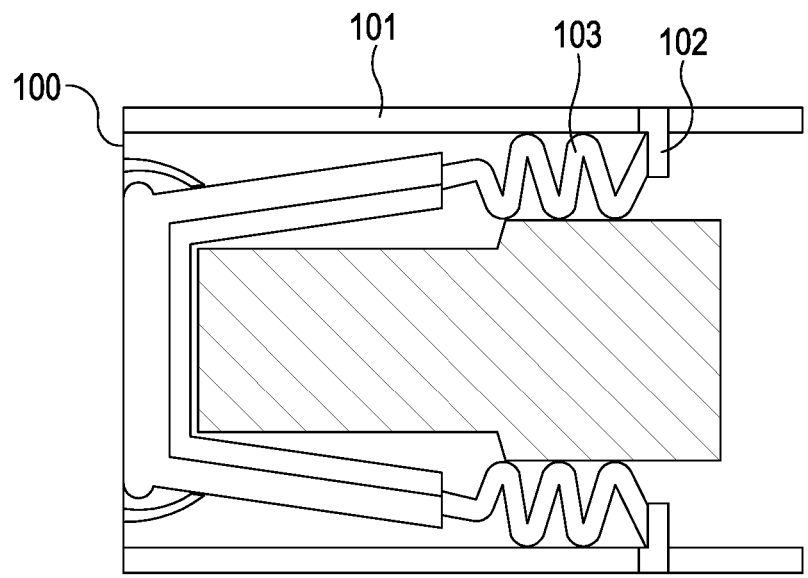

FIGS. 10A and 10B show an embodiment with a mount 100 which comprises an actuator 101 and a connecting arm 102 connected to an end of the 'bellows-like' cover portion 103. The embodiment of FIGS. 8A-D has a base portion 105 and an insert portion 106. In FIG. 10A the actuator 101 is in the non-gripping configuration in which the cover portion 103 is stretched in the left-right direction in FIG. 10A (i.e. along an elongation direction (e.g. axis) of the elongate member 107). For this reason, the cover portion 103 is maintained in an extended configuration in which the cover portion 103 does not contact, or minimally contacts, the elongate member 107 when the cap is applied. Upon applying the cap, the connecting arm 102 is slid along the actuator 101, This compresses the cover portion, or alternatively or additionally reduces tension on the cover member 103 in the elongation direction of the elongate member 107, and thereby allows resilience in the cover portion 103 to return the cover portion 103 to a configuration with a lower extent in the elongation direction. In either case, the cover portion 103 enters a configuration in which its inner radius is reduced. Thus, the movement of the connecting arm 102 manipulates the cover portion 103 into the gripping configuration, as shown in FIG. 10B, producing, or increasing, a radially inward force applied by the cover portion 103 to the exterior surface of the elongate member 107, thereby securing the cap to the elongate member 107. Note that in different forms of this embodiment, the cover portion 103 may either be compressed or relaxed when in the gripping configuration. In other words, in some forms of the embodiment the elastic material may be in a rest configuration in the gripping configuration and be stretched by the mount in the non-gripping configuration, and in some forms of the embodiment it may be in a rest configuration in the non-gripping configuration and be compressed into the gripping configuration.

The actuator may 101 be provided with a locking mechanism (not shown) to secure the cap in the gripping configuration, and additionally, in the case that the elastic material is compressed into the gripping configuration, to withstand the force the cover portion 103 exerts on the connecting arm 102 in resisting compression once the cap is secured to the elongate member 107.

Figure 10C:
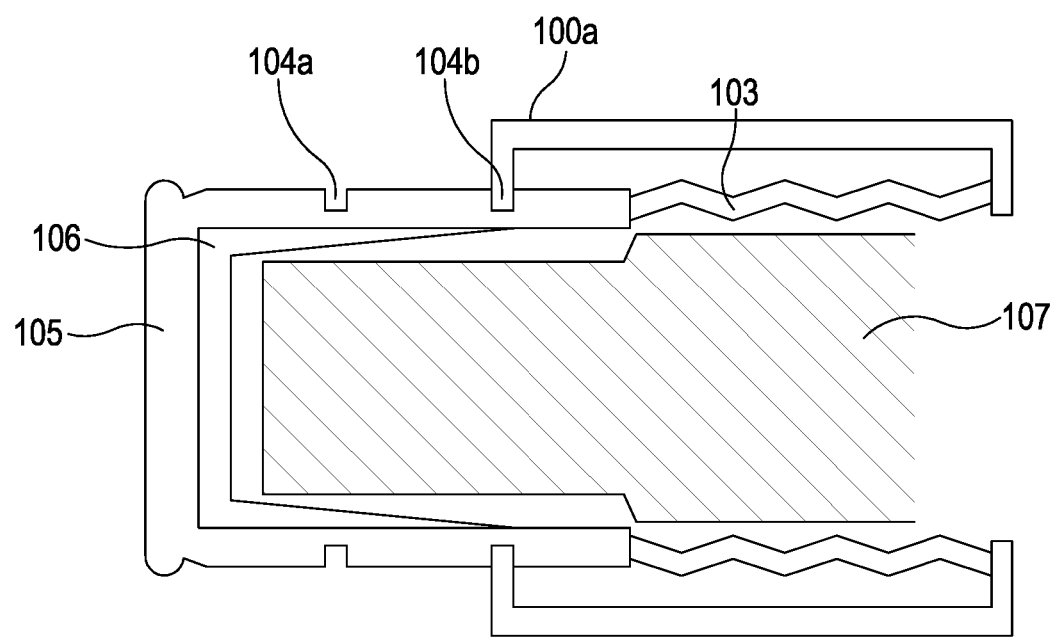
FIG. 10C-10D are cross-sectional diagrams showing a protective cap which is an eleventh embodiment of the invention, wherein the cap comprises an additional mount for the cover portion.
Figure 10D:
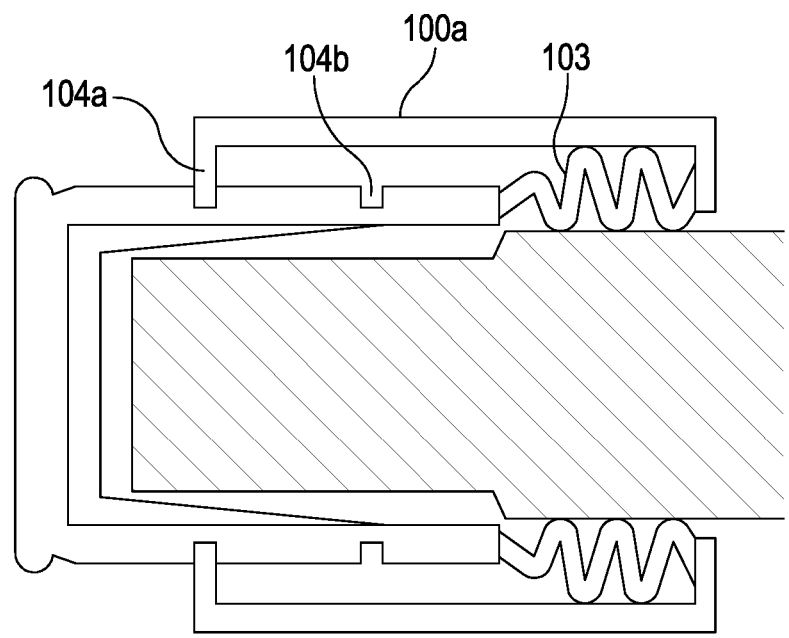

FIGS. 10C and 10D show a further embodiment with an alternative mount, in the form of a bayonet mount 100*a*. In this case, there are a number of bayonet grooves 104*a*, 104*b* provided on the outer surface of the tubular wall of the base portion 105. The embodiment of FIGS. 10A and 10B has an insert portion 106. The cover portion 103 is attached to the end of the bayonet mount 100*a*, and is otherwise the same as in FIGS. 10A and 10B. FIG. 10C shows the cover portion 103 in the non-gripping configuration, with the bayonet mount 100*a* locked in a groove 104*b* which ensures that the cover portion is held in a fully extended position. As shown in FIG. 10D, the bayonet mount 100*a* can be manipulated, either manually or mechanically, by moving it to in the left direction (i.e. closer the end section of the base portion 105) to manipulate the cover portion 103, and then secured in a suitable groove 104*a*. As with the actuator 100 of FIGS. 10A and 10B, this ensures that there is sufficient force applied by the cover portion 103 to the outer surface of the elongate member 107 to secure the cap to the elongate member 107. Note that in the case that the elastic material lies naturally in the non-gripping configuration, groove 140*b* is optional, since the cover portion 103 would hold the mount 100*a* in the non-gripping configuration before the cap is attached to the elongate member 107; therefore there may only be one groove 104*a*, used to lock the mount 100*a* in the gripping configuration.

In both embodiments shown in FIGS. 10A-D, the adjustable length of the cover portion 103, provided by the mount 100,100*a*, allows for the protective cap to be secured to an elongate member 107 having an outer diameter which is any value with a range of elongate member outer diameters (O.D.). In the case of an elongate member with a smaller outer diameter (O.D.), this will require greater compression of the cover portion when compared to an elongate member with a larger outer diameter (O.D.).

Note that although not all of insert portions of the embodiments described with reference to FIGS. 6-10 are depicted as including ridges on their respective insert portions 64, 74, 84, 94, 104, most of them may be provided with such ridges (or additional such ridges in the case of the embodiment of FIG. 7) on their inwardly facing surface. The ridges may be within the cavity (that is, in axial register along the axis with the tubular wall of the base portion), and each may substantially encircle the axis.

Attention will now be turned towards yet further embodiments of the protective cap, in particular different forms the insert portion may take.

Figure 11A:
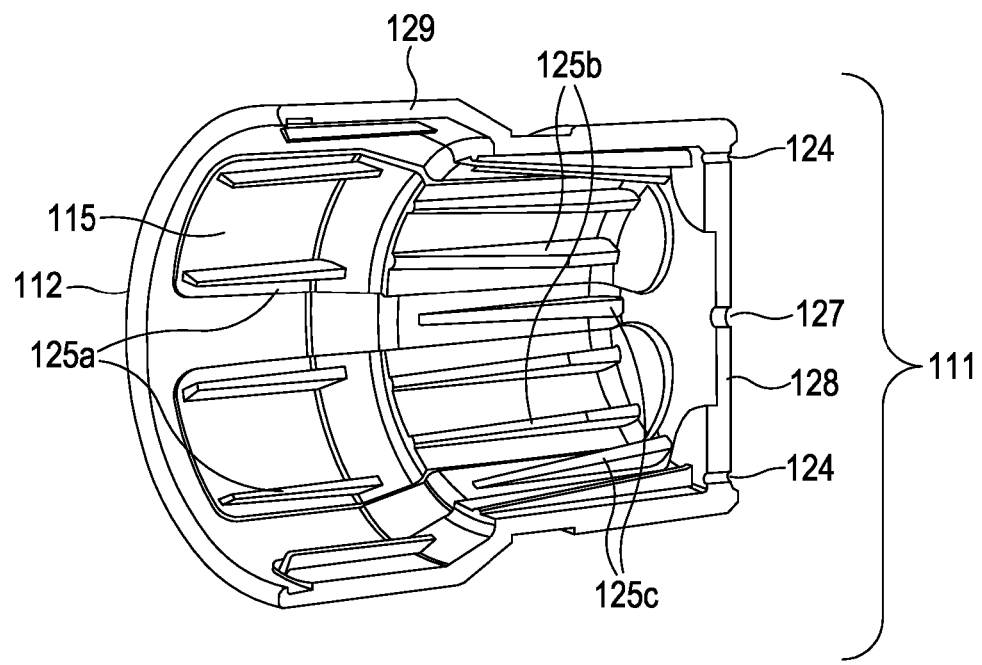
FIG. 11A-11B are diagrams showing a protective cap which is a twelfth embodiment of the invention, wherein the cap comprises a first alternate flexible insert portion.
Figure 11B:
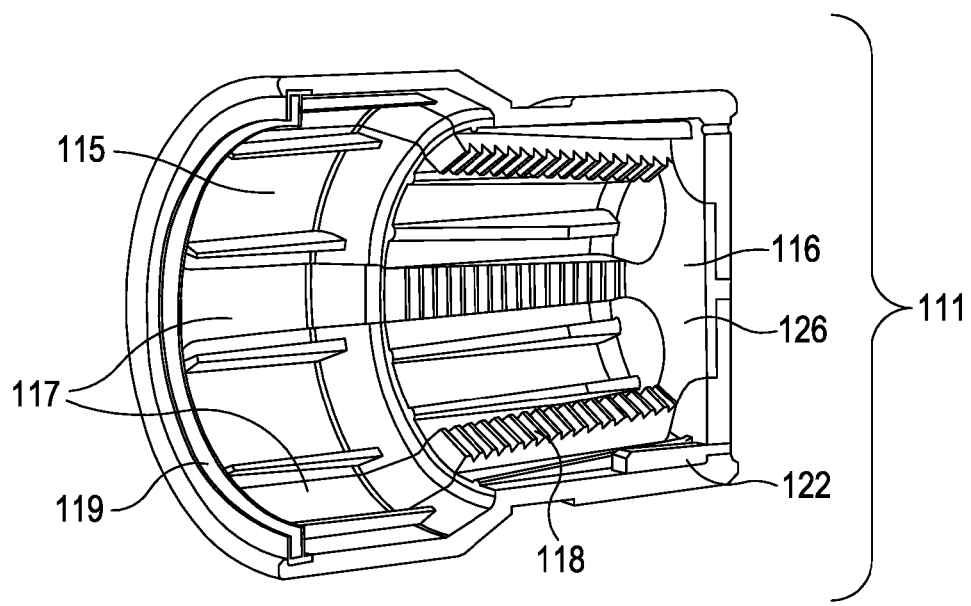
Figure 12:
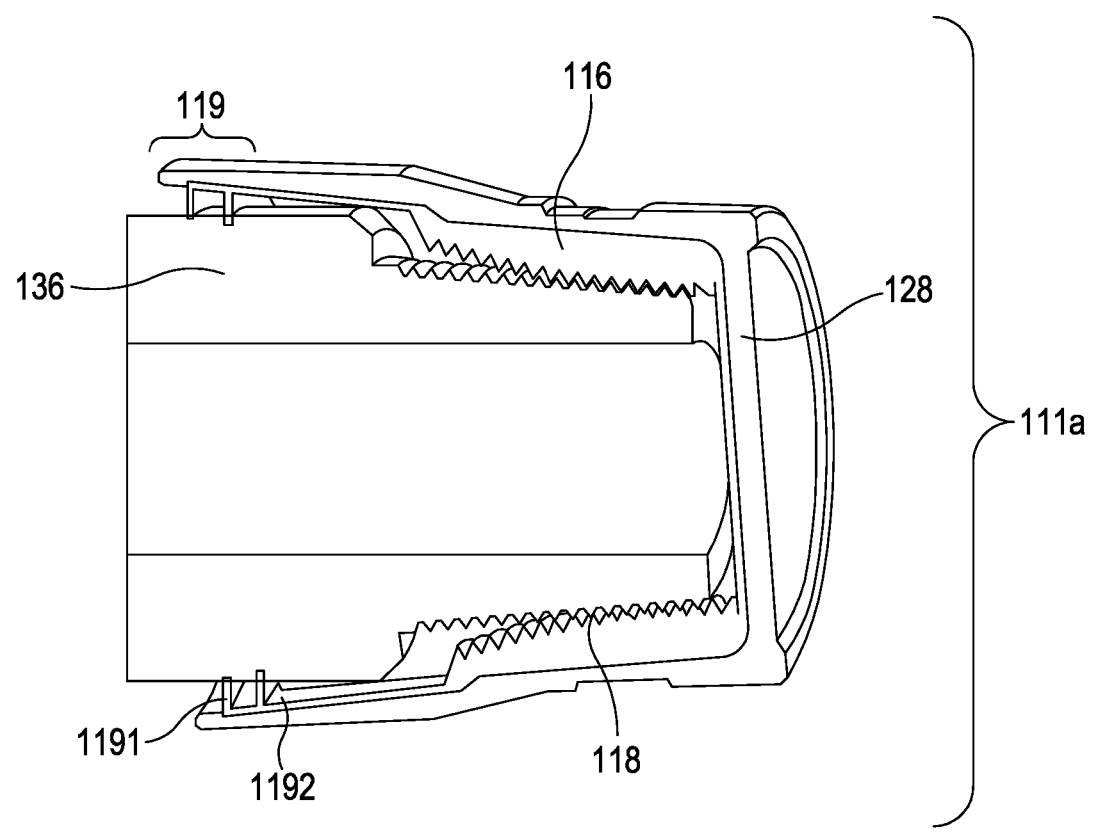
FIG. 12 is a cross-sectional diagram showing a protective cap which is a thirteenth embodiment of the invention, wherein the cap comprises a second alternate flexible insert portion.

FIGS. 11A-B and 12 show twelfth and thirteenth embodiments having an alternative type of insert portion.

FIG. 11A shows in cross-section a rigid base portion 115 of a protective cap 111 according to the twelfth embodiment. The rigid base portion 115 includes an end section 128 and a tubular wall 129 upstanding from the end section 128 around its periphery, to define a cavity. Note that in this embodiment the insert portion does not include a cover portion which extends out of the cavity and which is manipulated when the cap is to be placed onto an elongate object. The inner surface of the rigid base portion 115 defines a plurality of ribs (125*a*, 125*b*, 125*c*). The rigid base portion further defines a plurality of holes 124, 127 (referred to below as "vent holes"). These are, as explained below, are for receiving at least a portion of one or more integrated circuits (chips). Also, if at least one of the chips is operative to act as an LED, the holes permit the light to escape outside the cap, even when an elongate member is received in the cap. The outer rim 112 of the rigid base portion 115 provides a gripping edge, facilitating removal of the protective cap 111 following application of the protective cap 111 to an elongate member.

FIG. 11B shows the protective cap 111 of the twelfth embodiment additionally comprising an insert portion 116 inserted into the rigid base portion 115 of FIG. 11A. The insert portion 116 is formed of softer material than the rigid base portion 115. It comprises a plurality of flexible legs 117 for extending in a generally axial direction across the inwardly facing surface of the ridge base portion 115, a plurality of ridges 119 defining a seal, and an end portion 126. The insert portion 116 may be integrally formed (i.e. as a single piece). In an embodiment, the seal 119 may be substantially circularly symmetric about a central axis of the cap 111. In particular, the seal 119 may comprise two or more ridges extending circumferentially about the central axis of the cap, the ridges being spaced apart from one another in a direction parallel to the central axis of the cap. The ridges 119 may be positioned proximate the edge of the tubular wall 129 furthest from the end section 128, and they may thus be referred to as "outer ridges".

Inner ridges 118, which are closer to the end section 128 than the outer ridges 119, extend inwardly from each of the plurality of flexible legs 117. In an embodiment, the number of flexible legs 117 may be 4 or 5.

A smart module 122 may optionally be provided within the rigid base portion 115, so that it is protected from damage due to external collisions of the cap. The smart module may be attached to an inner surface of the rigid base portion. For example, the smart module 122 may be configured to be inserted into and co-operate with a first vent hole 124—for example, an LED may extend from the smart module 122 into the first vent hole 124 when the smart module 122 is installed in the rigid base portion 115. The LED may serve as an indicator of a property associated with the cap 111, or an element thereof. Alternatively or additionally, the smart module 122 may include an RFID chip as described below with reference to FIG. 13.

The end portion 126 may optionally be configured to co-operate with a second vent hole 127 defined by the end section 128 of the rigid base portion 115.

Optionally, the ribs 125c may be integral with the tubular wall 129. This provides increased robustness and smoothness of the rigid base portion 115. The ribs 125a increase the strength of the protective cap 111, and reduce the probability that the protective cap 111 will, when applied to an elongate member, rotate with respect to the elongate member, thereby reducing packing loss. The ribs 125c interact with respective ones of the legs 117 to retain the insert portion 116 in the base portion 115, an in particular to prevent the insert portion 116 from rotating about the axis relative to the base portion 115.

The ribs 125b further increase the strength of the protective cap 111. In an embodiment, the smart module 122 is configured to be attached to one or more of the ribs 125b. Alternatively, the smart module 122 may be located between the ribs 125b. The ribs 125b also facilitate stacking of the protective caps 111, by acting as supports when the protective caps 111 are stacked. This reduces deformation of the insert portion 116 when two or more caps 111 are stacked.

In an embodiment, a grip pattern may be provided on an outside surface of the protective cap 111. The grip pattern may be substantially aligned with the ribs 125a and 125b. The grip pattern allows the protective cap 111 to be applied more easily to an elongate member, and further facilitates robotic handling of the protective cap 111.

FIG. 12 shows a thirteenth embodiment of the invention which is a protective cap 111a which is equivalent to the protective cap 111 of FIGS. 11A-B except that it omits the holes 124, 129 and the smart module 122. The protective cap 111a is illustrated applied to the male connecting portion of a threaded pipe 136. The seal 119 may be reliantly urged against the outer surface of the threaded pipe 136, as shown in FIG. 12, preferably so as to provide an airtight seal encircling the threaded pipe 136. The circumferential sealing portion 119 comprises two circumferential ridges 1191 and 1192, increasing the sealing efficiency of the protective cap 111 when applied to an elongate member such as a threaded pipe 136.

Optionally, the surfaces of each ridge 118 which face respectively towards and away from the end section 128 may converge towards their inward edge. That is, they may define an angle (e.g. of substantially 8 degrees) therebetween. This confers improved flexibility of the ridges 118, and allows the cap 111 to accommodate a greater range of pipe diameters and thread configurations. The ridges 118 may optionally engage with the surface formation (e.g. a thread) on the outer surface of the elongate member 136.

Figure 13:
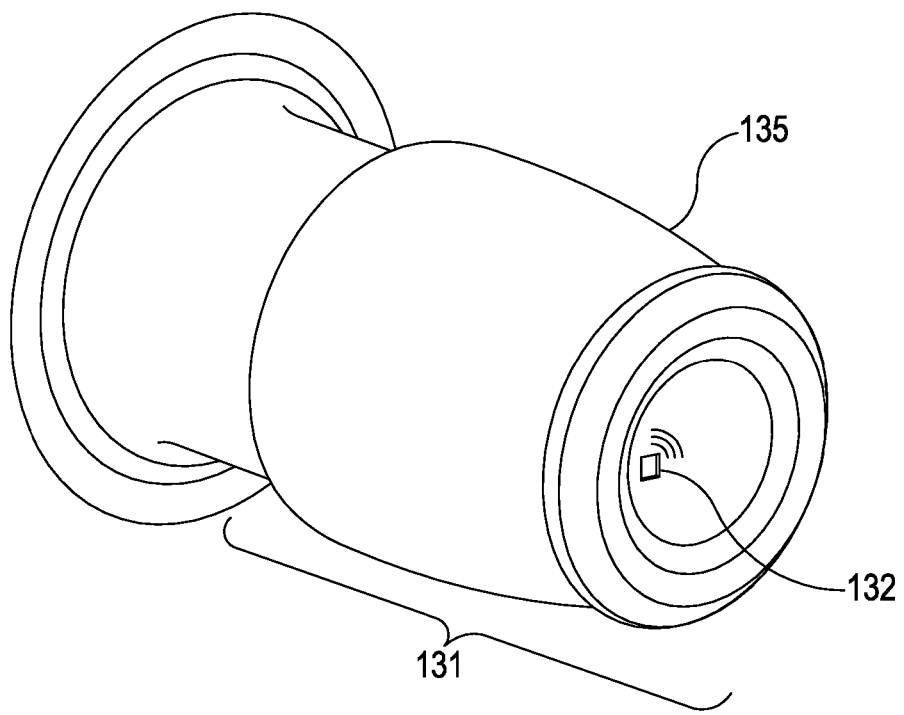
FIG. 13 is a diagram showing a protective cap which is a fourteenth embodiment of the invention, wherein the cap comprises a RFID chip.

Attention will now be turned towards a fourteenth embodiment of the protective cap shown in FIG. 13. The fourteenth embodiment comprises a protective cap 131 and a RFID chip 132 embedded (installed) in the rigid base portion 135 of the protective cap 131. The RFID chip 132 comprises a memory for storing information related to at least one property of the cap 131. The information 133 may be indicative of one or more of: a lifespan of the cap 131, a certification standard of the cap 131, a current acceleration of the cap 131, a current temperature of the environment in which the cap 131 is located (and/or optionally a history of such temperatures at one or more previous times), a current humidity level of the environment in which the cap 131 is located (and/or optionally a history of such humidity levels at one or more previous times), and a current location of the cap 131 (and/or optionally a history of such locations at one or more previous times). The acceleration, temperature, humidity and/or location may be measured by sensors located in the cap. The locations may for example be obtained by a GPS sensor; for example, one of the RFID chip(s) 132 may include a GPS sensor. The RFID chip 132 may be operative, e.g. upon receipt of an interrogation signal and/or at intervals, to transmit some of the information stored therein to a reader device external to the cap. Thus, advantageously, the RFID chip 132 may allow caps 131 according to this embodiment to be individually identified and tracked, for example throughout a manufacturing or assembly process, or during transportation of the cap 131. The RFID chip 132 may be a portion (or all) of the smart module 122 described above in relation to FIG. 11.

In an embodiment, the protective cap 131 in which the RFID chip 132 is installed may be a protective cap according to any preceding embodiment.

The protective caps and bungs of the above embodiments typically do not have a threaded section which matches a threaded section which the elongate member may have. The protective caps and bungs are held in place on the surface of the elongate member by friction. Thus, a cap or bung which is one of the present embodiment and which has a certain diameter, is able to be attached to any elongate member within a range of diameters. For example, drill pipes tend to have an outer diameter (O.D.) in the range of 2" to 8.5". This range may be adequately covered by about four bungs/caps of different respective sizes. This reduces the required number of protectors to protect the range of pipes that will be used in drilling operations, such as mining or oil and gas drilling and exploration operations. In principle, the protective cap could be used for other elongate elements employed in the drilling industry, such as drill bits.

Many variations are possible within the scope of the invention, as will be clear to a skilled reader. For example, in some embodiments the outer profile of the rigid base portion may have a profile, looking along the central axis, which is not circular. It may, for example, appear as generally square, e.g. with rounded corners. The insert portion in this case also is preferably formed so that the insert portion has a shape which conforms to, and in use lies against, the inwardly-facing surface of the rigid base portion.

In another example, the protective cap could be applied to a box end, rather than a pin end, of a pipe, or could be applied to any other elongate object, such as one for use in the drilling or mining industry.

In another example, the RFID chip 132 and/or smart module 122 may be provided at least partly within (that is, at least partly inside the convex hull of) a protective member which is a bung for insertion into the end of a hollow elongate member. The bung may for example, be a bung member such as one of the bungs described above with reference to FIG. 3 or 5, comprising a male portion, a handle and ridge(s) extending outwardly from the male portion.

The invention claimed is:

1. A protective cap for covering an outer surface of an elongate member, the protective cap comprising:
    a rigid base portion having an end section and a tubular wall upstanding from the end section to define a cavity;
    an insert portion of flexible, resilient material, inserted into the cavity, an inner surface of the insert portion being for receiving and contacting an end of the elongate member, the inner surface of the insert portion having one or more first ridges; and
    whereby, when the end of the elongate member is received within the insert portion the first ridges grip a portion of the outer surface of the elongate member,
    the cap defining a central axis surrounded by each of the base portion and the insert position, wherein the first ridges are circular, and
    wherein the insert portion comprises an end portion contacting the end section of the base portion, and a plurality of legs connecting the end portion and the one or more first ridges, wherein one or more second ridges are upstanding from an inner surface of the legs.

2. A protective cap according to claim 1, wherein the cap further comprises a cover portion of flexible resilient material, extending out of the base portion,
    whereby, when the end of the elongate member is received within the insert portion with the cover portion in a non-gripping configuration, the cover portion can be manipulated into a gripping configuration where the cover portion grips a portion of the outer surface of the elongate member.

3. A protective cap according to claim 2, wherein the insert portion is contiguous with the cover portion.

4. A protective cap according to claim 2, wherein the insert portion is formed of the same material as the cover portion.

5. A protective cap according to claim 1, wherein the inner surface of the insert portion is circularly symmetric about the central axis.

6. A protective cap according to claim 1 wherein the ridges are provided with a lubricant for dispersing on the outer surface of the elongate member.

7. A protective cap according to claim 2, wherein the cap further comprises a retraction portion, extending from the cover portion, and the manipulation of the cover portion into the gripping configuration comprises unfurling the cover portion to grip a portion of the outer surface of the elongate member,
    wherein, when the cover portion is unfurled, the retraction portion does not cover the outer surface of the elongate member as tightly as the cover portion, the retraction portion being for receiving force to gather the cover portion.

8. A protective cap according to claim 2, wherein the rigid base portion is provided with a valve, the cover portion comprises an inflatable balloon, and the cap further comprises a duct connecting the valve to the cover portion,
    whereby the cover portion is in the non-gripping configuration when the balloon is not inflated, and, when the end of the elongate member is received within the insert portion with the cover portion in a non-gripping configuration, the cover portion can be manipulated into the gripping configuration by inflating the balloon via the duct so that the balloon grips a portion of the outer surface of the elongate member.

9. A protective cap according to claim 2, wherein the rigid base portion is provided with a valve, and the cover portion further comprises a seal for securing to the outer surface of the elongate member,
    whereby, when the end of the elongate member is received within the insert portion with the cover portion in a non-gripping configuration, the cover portion is manipulated into the gripping configuration by withdrawing air through the valve to create a vacuum within the insert portion which secures the cover portion to the elongate member.

10. A protective cap according to claim 2, wherein the cover portion comprises a fold of material,
    wherein the cover portion is in the gripping configuration when the fold of material is compressed against the portion of the outer surface of the elongate member.

11. A protective cap according to claim 2, wherein the base portion comprises a groove on an outer surface of the tubular wall, operative to contain the cover portion when the cover portion is in the non-gripping configuration,
    whereby, when the end of the elongate member is received within the insert portion with the cover portion in a non-gripping configuration, the cover portion is manipulated into the gripping configuration by displacing the cover portion from the groove to a portion of the outer surface of the elongate member so as to grip the portion of the outer surface of the elongate member.

12. A protective cap according to claim 2, wherein the protective cap further comprises a mount connected to the base portion and the cover portion, the mount being positionable relative to the base portion, thereby manipulating the cover portion between the gripping and non-gripping configurations,
    whereby the end of the elongate member is received within the insert portion when the cover portion is in a non-gripping configuration, and movement of the mount relative to the base portion manipulates the cover portion into the gripping configuration in which the cover portion grips the portion of the outer surface of the elongate member.

13. A protective cap according to claim 1, further comprising a chip, located in the rigid base portion, the chip having a memory for storing information regarding at least one property of the cap.

14. A protective cap according to claim 13 in which the chip is an RFID chip.

15. A protective cap according to claim 13 in which the at least one property comprises a physical property of the cap or its present environment.

16. A protective cap according to claim 13 in which the chip is embedded in the material of the rigid base portion.

17. A protective cap according to claim 13 in which the chip is a portion of a smart module attached to an inner surface of the rigid base portion.

18. A method for positioning a protective cap on an outer surface of an elongate member, the protective cap comprising:
- a rigid base portion having an end section and a tubular wall upstanding from the end section to define a cavity;
- an insert portion of flexible, resilient material, inserted into the cavity, an inner surface of the insert portion being for receiving and contacting an end of the elongate member, the inner surface of the insert portion having one or more first ridges; and
- whereby, when the end of the elongate member is received within the insert portion the first ridges grip a portion of the outer surface of the elongate member,
- the cap defining a central axis surrounded by each of the base portion and the insert portion, wherein the first ridges are circular,
- wherein the insert portion comprises an end portion contacting the end section of the base portion, and a plurality of legs connecting the end portion and the one or more first ridges, wherein one or more second ridges are upstanding from an inner surface of the legs, and the method comprising:
- inserting an end of the elongate member into the insert portion, so that an inner surface of the insert portion contacts the outer surface of the elongate member.

19. A method according to claim 18, wherein the elongate member is a pin end of a pipe, the pin end of the pipe having an outwardly-facing threaded section, wherein:
- said inserting of the end of the pipe includes inserting the outwardly-facing threaded section of the pipe into the insert portion.

20. A method according to claim 19, wherein the pipe is a drill pipe or casing.

* * * * *